(12) United States Patent
Ettes et al.

(10) Patent No.: US 9,136,777 B2
(45) Date of Patent: Sep. 15, 2015

(54) CAPACITIVELY COUPLED POWER SUPPLY SYSTEM

(75) Inventors: Wilhelmus Ettes, Drachten (NL);
Ronald Van Langevelde, Eindhoven (NL); Hugo Veenstra, Eindhoven (NL);
Franciscus Adrianus Cornelis Maria Schoofs, Valkenswaard (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 283 days.

(21) Appl. No.: 13/521,238

(22) PCT Filed: Feb. 14, 2011

(86) PCT No.: PCT/IB2011/050602
§ 371 (c)(1),
(2), (4) Date: Jul. 10, 2012

(87) PCT Pub. No.: WO2011/101779
PCT Pub. Date: Aug. 25, 2011

(65) Prior Publication Data
US 2013/0128639 A1 May 23, 2013

(30) Foreign Application Priority Data
Feb. 18, 2010 (EP) .................................... 10153935

(51) Int. Cl.
*H02M 7/217* (2006.01)
*H02M 7/06* (2006.01)
*H02M 1/00* (2007.01)

(52) U.S. Cl.
CPC ............... *H02M 7/06* (2013.01); *H02M 7/217* (2013.01); *H02M 2001/0032* (2013.01); *Y02B 70/16* (2013.01)

(58) Field of Classification Search
USPC ................. 323/272, 282; 363/69, 70, 89, 126
See application file for complete search history.

(56) References Cited

U.S. PATENT DOCUMENTS 4,084,217 A * 4/1978 Brandli et al. ..................... 363/4
4,222,096 A * 9/1980 Capewell ......................... 363/44
(Continued)

FOREIGN PATENT DOCUMENTS

EP 1081837 A1 3/2001
JP 605776 A 1/1985
(Continued)

OTHER PUBLICATIONS

Laurent Gonthier & Ghafour Benabdelaziz, "Appliance standby loss reduction using AC switches", STMicroelectronics, IMS, ASD & IPAD Division, 16 rue Pierre et Marie Curie—BP7155—37071 Tours Cedex 2, France, pp. 1-9.
(Continued)

*Primary Examiner* — Jeffrey Sterrett

(57) ABSTRACT

A power supply system (200) is provided which comprises a first input (206), an output (218), a DC-DC converter (204), a rectifying circuit (212) and a voltage limiter (214). An AC voltage is received by the first input. Power is supplied to a load (216) via the output. The DC-DC converter comprises a second input (203) which is capacitively coupled to the first input, and the DC-DC converter provides power to the output. The rectifying circuit is capacitively coupled to the first input and is arranged between the first input and the output. The rectifying circuit provides a rectified output voltage to the output. The voltage limiter is coupled to the output and limits the rectified voltage to a predefined voltage.

17 Claims, 25 Drawing Sheets

(56) References Cited

U.S. PATENT DOCUMENTS

| | | | |
|---|---|---|---|
| 4,555,753 A * | 11/1985 | Takahashi | 363/126 |
| 4,600,982 A | 7/1986 | Graham | |
| 6,366,058 B1 | 4/2002 | Honsberg | |
| 6,671,194 B2 * | 12/2003 | Takahashi | 363/69 |
| 6,760,233 B2 | 7/2004 | Tolle | |
| 7,345,383 B2 | 3/2008 | Zushi | |
| 2002/0075708 A1 | 6/2002 | Van Den Berg | |
| 2003/0016546 A1 | 1/2003 | Tolle | |
| 2005/0162022 A1 | 7/2005 | Allard | |
| 2006/0034109 A1 | 2/2006 | Benabdelziz | |
| 2013/0128639 A1 * | 5/2013 | Ettes et al. | 363/126 |

FOREIGN PATENT DOCUMENTS

| | | |
|---|---|---|
| JP | 6034782 | 3/1985 |
| JP | 249381 | 4/1990 |
| JP | 2001103740 A | 4/2001 |
| JP | 201004613 A | 1/2010 |

OTHER PUBLICATIONS

Franz Luckasch, "Cost efficient mains powered supply concepts for wireless sensor nodes", Institute of Technology, Univ. of Technology, Vienna, Austria, pp. 1-4.

* cited by examiner

CAPACITIVELY COUPLED POWER SUPPLY SYSTEM

FIELD OF THE INVENTION

The invention relates to the field of capacitively coupled power supply systems.

BACKGROUND OF THE INVENTION

Household appliances have often a controller which requires a low supply voltage and a power stage which is fed from the mains voltage. The controller switches the power stage on and off and controls the operation thereof. The power stage performs the primary function of the household appliance. The controller responds to, for example, a push button or a signal from a remote control device to switch on and off the power stage. When the household appliance is connected to the mains voltage, the controller only monitors signals that may indicate that the household appliance has to be switched on. The mode wherein the power stage is switched off is called the standby mode. In the standby mode only a small amount of power at a low voltage is consumed to keep the controller and/or an optional remote control sensor awake. When a signal is received to switch on the appliance, the controller enters the operational mode. The power stage is switched on and the controller starts controlling the power stage. Further, the controller may switch on a user-interface to receive additional input from the user and/or to provide feedback to the user. The user-interface is in general powered with the low supply voltage as well. In the operational mode more power than the standby power is consumed by the low supply voltage circuits.

An example of such a household appliance is a coffee maker which may be switched on and off by means of a push button. When the coffee maker is switched on by pushing the on/off push button, the controller switches the coffee maker to the operational mode wherein, depending of the different stages of coffee brewing, the operation of the heating element and, for example, the operation of the water pump is controlled. When the on/off push button is pushed once again, the controller switches off the heating element and/or the water pump and enters the standby mode during which only signals from the push button are monitored.

The low supply voltage is often supplied by a capacitive power supply. A capacitive power supply has a capacitor which provides a capacitive coupling to an AC mains voltage and acts as a charge-pump. A rectifying circuit is used to obtain a DC voltage which is often limited to a low voltage by a zener diode. Depending on the specific configuration of the rectifying circuit only half of the AC mains voltage wave is converted to the low DC supply voltage, or, if full-wave rectification is implemented, the whole AC mains voltage wave is converted. Often a surge resistor is coupled in series with the capacitor and often a bleed resistor is coupled in parallel to the capacitor. The surge resistor protects the power supply against mains voltage peaks and the bleed resistor discharges the capacitor when the power supply is disconnected from the mains voltage.

The capacitive power supply is a relatively efficient power supply because the capacitor does not dissipate power. However, the capacitive power supply can provide a limited amount of power only, because the maximum current that may be delivered is limited by the impedance of the capacitor at the mains voltage frequency. The capacitive power supply is dimensioned for the maximum amount of power that has to be delivered in an operational mode of the household appliance. If, however, less power is consumed by the apparatus, the capacitive power supply, dissipates the surplus energy. Especially in the standby mode too much power is dissipated by the zener diode, because the power which was delivered to the apparatus in the operational mode is dissipated by the zener diode in the standby mode. Further, the surge resistor and the bleed resistor dissipate power in the operational as well as in the standby mode. The power dissipation in, especially, the standby mode is too high and as such the efficiency of the capacitive power supply is too low in the standby mode.

The power dissipation in the surge resistor, the bleed resistor and the zener diode have a linear or quadratic relation with the capacitance of the capacitor. A smaller capacitor results in smaller power losses. Reducing the capacitance of the capacitor is often not possible, because the maximum deliverable power also has a linear relation with the capacitance of the capacitor.

SUMMARY OF THE INVENTION

It is an object of the invention to provide a more efficient power supply system.

A first aspect of the invention provides a power supply system as claimed in claim 1. A second aspect of the invention provides an electronic device as claimed in claim 13. A third aspect of the invention provides an electronic device as claimed in claim 14. A fourth aspect of the invention provides a controller as claimed in claim 15. Advantageous embodiments are defined in the dependent claims.

A power supply system in accordance with the first aspect of the invention comprises a first input to receive an AC voltage and an output to supply power to a load. The power supply system further comprises a DC-DC converter, a rectifying circuit and a voltage limiter. The DC-DC converter supplies power to the output of the power supply system and comprises a second input that is capacitively coupled to the first input. The rectifying circuit is capacitively coupled to the first input and is arranged between the first input and the output. The rectifying circuit supplies a rectified output voltage to the output. The voltage limiter is coupled to the output and limits the rectified output voltage to a predefined voltage.

The power which is consumed by the load is provided via two parts of the power supply system. One part is the rectifying circuit which is capacitively coupled to the mains voltage. The rectifying circuit provides a rectified voltage via the output to the load. The rectified voltage at the output of the power supply system is limited by the voltage limiter to the predefined voltage. The amount of power which may be delivered via the rectifying circuit is limited by the capacitance of a capacitor which couples the rectifying circuit to the first input of the power supply system. However, the output voltage tends to increase if not all the power which may be delivered via the rectifying circuit is consumed by the load. If the output voltage increases too much, the voltage limiter prevents the increase above the predefined voltage by dissipating a part of power received from the rectifying circuit.

Another part of the power supply system is the DC-DC converter. The DC-DC converter has a second input which is capacitively coupled to the mains voltage. The DC-DC converter converts a first voltage received by the second input into a second voltage and provides power to the output of the power supply system.

In the standby mode of an apparatus comprising the power supply system the load does not consume much power. The standby power may be provided via the rectifying circuit. In the operational mode the load consumes more power and the additional power may be provided by the DC-DC converter.

Thus, the rectifying circuit and the capacitor which capacitively couples the rectifying circuit to the first input may be dimensioned on basis of power requirements of the standby mode only. Matching the capacitance of the capacitive coupling of the rectifying circuit to the power use in the standby mode prevents the dissipation of a lot of power which is provided via the rectifying circuit by the voltage limiting circuit in the standby mode. Thus, the power supply system operates more efficiently in the standby mode.

The DC-DC converter and the capacitor that provides the capacitive coupling of the DC-DC converter, may be dimensioned for the expected power use of the load in the operational mode. If not much power is consumed by the load, the DC-DC converter does not convert any, or only a small amount of power. It is known that DC-DC converters also dissipate some power, however, they are relatively efficient. Thus, in the standby mode the possible small power dissipation in the DC-DC converter does not outweigh the relatively large reduction of power dissipation in the voltage limiter.

Further, a DC-DC converter often requires a filter circuitry such that the DC-DC converter is Electromagnetic compatible. It was seen by the inventors that the DC-DC converter of the power supply system according to the first aspect of the invention does not require such a filter circuitry to provide a power supply system that is Electromagnetic compatible.

The AC voltage that is received by the input of the power supply system may be the mains voltage, but may be another AC voltage as well. It is to be noted that AC voltage does not necessarily mean that the voltage level of the AC voltage alternates between a positive and a negative voltage. The voltage level may also alternate between two different positive voltages or between two different negative voltages. The capacitive coupling of the rectifying circuit and the DC-DC converter to the AC voltage may be provided by one shared capacitor or by a plurality of capacitors of which each specific capacitor is used either by the DC-DC converter or by the rectifying circuit. Because of the capacitive coupling, the circuit has a charge pump behavior. The rectifying circuit may be half-wave rectifying circuit which only conducts a current either when the AC voltage increases or when the AC voltage decreases. The rectifying circuit may be a full-wave rectifying circuit which conducts a current when the AC voltage increases and when the AC voltage decreases. The DC-DC converter may receive the power of one half of the AC-wave of the input AC voltage, for example, only an increasing-voltage part of the AC-wave, and the rectifying circuit only rectifies the other half of the AC-wave, for example, only a decreasing-voltage part of the AC-wave. Further, the DC-DC converter is not limited to a specific type of DC-DC converter. The voltage limiter may be a zener diode, or an integrated circuit, which limits or stabilizes the voltage of the output.

It is to be noted that the rectifying circuit provides a rectified voltage which is a voltage that does not alternate between positive and negative, but may alternate between a maximum value and a minimum value, which may be a value substantially equal to zero. The minimum and maximum value have the same sign, for example, they are both positive. In a practical embodiment the rectified voltage is provided to an energy storage, such as a storage capacitor, for obtaining a more smooth rectified voltage being a substantially stable DC voltage.

In an embodiment, the power supply system further comprises a further rectifying circuit and a further voltage limiter. The further rectifying circuit is capacitively coupled to the first input and provides a further rectified voltage to the second input. The further voltage limiter is coupled to the second input and limits the further rectified voltage of the second input to a further predefined voltage.

The capacitor of the capacitive coupling acts as a current source. The dimensioning of the capacitor and the further predefined voltage determine the power that may be received by the DC-DC converter and that may be converted by the DC-DC converter. The dimensioning may be performed such that an optimum is found between power dissipation in the further voltage limiter, especially in a standby mode, and the amount of power that may be converted by the DC-DC converter. Thus, the power supply system may operate more efficient.

The AC voltage at the input is often the mains voltage. Components of the power supply system that receive or may receive such a high voltage have to be dimensioned for withstanding the high voltage. Especially in the DC-DC converter several components, like a controllable switch and possibly a controller, have to be manufactured with a high-voltage process which results in much more expensive components of the DC-DC converter. By limiting the further predefined voltage to a low voltage, the components of the DC-DC converter may be manufactured at a lower price.

Basically, the power supply system of the embodiment may be a full-wave capacitive supply with two output voltages of which one of the output voltages is converted into the other output voltage by the DC-DC converter. The known full-wave power supplies have often a first output voltage, a neutral output terminal and a second output voltage whose absolute value is the same as the absolute value of the first voltage and the sign of the second output voltage differs from the sign of the first output voltage. If, however, with such a full-wave power supply only one voltage has to be supplied, the first voltage and the second voltage have to be reduced such that one voltage may be obtained by connecting the load between the output terminals with the first and the second output voltage. But, reducing the output voltage results in increasing the capacitance of the capacitor or capacitors of the capacitive coupling when the total required output power has to remain the same. Consequently, a higher standby power loss is introduced. With the power supply system according to the embodiment the output voltage does not have to be reduced because the first voltage is converted into the second voltage. Thus, the capacitance of the capacitor or the capacitors of the capacitive coupling do not have to be increased and an increase of power losses in the standby mode is prevented.

In a further embodiment, the absolute value of the further predefined voltage is larger than the absolute value of the predefined voltage.

Several power losses in the power supply system have a linear or quadratic relation with the capacitance of the capacitor. Especially, the dissipation of power in the voltage limiter or in the further voltage limiter has a linear relation with the capacitance of the capacitor. Further, in a practical embodiment of the power supply system the capacitive coupling comprises a bleed resistor and surge resistor which dissipate power as well and their dissipation has a quadratic and linear relation, respectively, with the capacitance of the capacitor.

The predefined voltage is determined by the requirements of the load. The power which is consumed by the load in, for example, the standby mode may be provided via the rectifying circuit and depends on the current that may be provided via the capacitive coupling of the rectifying circuit. The capacitance of the capacitor which provides the capacitive coupling to the rectifying circuit may be minimized for the standby mode. As such, the power losses are minimized in a first branch of the power supply system which comprises the rectifying circuit.

A second branch of the power supply system, which comprises the further rectifying circuit and the DC-DC converter, may provide a further amount of power to the output which is limited by the capacitance of the capacitor and the value of the further predefined voltage. The capacitance of the capacitor determines the maximum current that may be provided to the second input of the DC-DC converter. By increasing the further predefined voltage at a same current, the amount of power that may be provided via the second branch is increased without increasing the capacitance of the capacitor which provides the capacitive coupling of the second branch. Thus, a relatively low amount of power may be dissipated in the further voltage limiter and/or may be dissipated in the bleed and surge resistor of the capacitive coupling of the second branch.

Thus, the dissipation of power in the first branch and the second branch is limited and as such the power supply system operates more efficiently.

The DC-DC converter operates relatively efficiently and dissipates only a small amount of power while converting the voltage on the second input to the power which is provided to the output of the power supply system. The power losses in the DC-DC converter are much smaller than the reduction of power losses in the further voltage limiter and the capacitive coupling.

The capacitive coupling of the first branch may be provided via another capacitor than the capacitor of the second branch. It is to be noted that also only one capacitor may be used to provide the capacitive coupling of both rectifying circuits to the input of the power supply system. Especially when the first branch only uses power of one half wave of AC input wave and when the second branch uses power of the other half wave of the AC input wave, only one capacitor has to be used which is advantageous with respect to the costs of the power supply system. It results in a power supply system where during one half of the AC input wave the capacitor provides a current to the first branch, and during the other half wave the capacitor provides a current to the second branch. The capacitance of the capacitor determines the value of the current. By choosing a specific predefined voltage and a specific further predefined voltage, the amount of power that may be delivered via the first branch and the second branch may be dimensioned, while the power losses are mainly determined by the capacitance of the capacitor.

In a further embodiment, the power supply system operates either in a standby mode or in an operational mode. In the operational mode operational power is provided to the load and in the standby mode standby power is provided at the output of the power supply system. The power supply system further comprises a controllable switch which is arranged in parallel to the further voltage limiter. By closing the controllable switch the further voltage limiter is short-circuited. The power supply system further comprises a controller to close the controllable switch in the standby mode. Or, the power supply system comprises a further short-circuiting controllable switch arranged between a node shared by the capacitive coupling and the further rectifying circuit and a node of the power supply system having a neutral voltage, and comprises the controller for closing the further short-circuiting controllable switch in the standby mode, The closing of the controllable switch reduces the voltage across the further voltage limiter to zero, which prevents the power dissipation in the further voltage limiter. Effectively, in the standby mode, the capacitor of the capacitive coupling between the further rectifying circuit and the input is connected in parallel to the AC voltage of the input. A capacitor in parallel to an AC voltage does not dissipate energy. Further, the closing of the switch reduces the voltage of the second input to zero which results in the switching off of the DC-DC converter. Thus, the DC-DC converter can not dissipate energy in the standby mode. Hence, the closing of the switch results in a more efficient power supply in the standby mode.

It is to be noted that the amount of standby power that may be provided by the power supply system is smaller than the amount of operational power. Further, it is to be noted that in the standby mode as well as in the operational mode the power supply system consumes more energy of the AC voltage at the first input than the amount of power that is consumed by the load because of energy losses in the power supply system. For example, in the standby mode the total power consumption by the power supply system is the addition of the power dissipation of by the power supply system in the standby mode and the power consumption by the load in the standby mode.

In an embodiment, the absolute value of the further predefined voltage is in a range having a lower bound of the absolute value of the predefined voltage and having an upper bound being a value that is 20 times larger than the absolute value of the predefined voltage.

As discussed in another embodiment, as soon as the further predefined voltage is larger than the predefined voltage, a branch of the power supply system comprising the DC-DC converter and the further rectifying circuit is able to provide more power. On the other hand, if still the same amount of power has to be delivered, the capacitance of the capacitor providing the capacitive coupling of the branch may be reduced and as such the power losses in the branch are reduced. The upper bound of the further predefined voltage is mainly limited by the production costs of components of the DC-DC converter. For example, when the further predefined voltage is for example 2.5 volts, the upper limit for the further predefined voltage is 50 volts, which still allows the use of only low voltage components in the DC-DC converter. In general, a low voltage component is not manufactured for withstanding voltage higher than 100 volt. Thus, the upper bound for the further predefined voltage may be 100 volt, however, a safety margin of a factor 2 results in a more reliable power supply system.

In another embodiment, the predefined voltage is −5 volt and the further predefined voltage is in a range from 5 to 50 volts.

A predefined voltage of −5 volt is advantageous for use in household appliances if a triac in the mains circuitry of the appliance has to be switched by a controller that receives its power from the output of the power supply system. The triac consumes less power from the low voltage triac-switching signal when the triac-switching signal is a negative voltage.

In another embodiment, the predefined voltage is substantially equal to −3.3 volt, and the further predefined voltage is in a range from 3.3 to 33 volts.

The further predefined voltage is a positive voltage, while the predefined voltage is a negative voltage. This is advantageous, because it allows, for example, the generation of the predefined voltage on basis of the decreasing-voltage part of the AC input voltage wave and allows the generation of the further predefined voltage on basis of the increasing-voltage part of the AC input wave and, as discussed in another embodiment this may result in a lower capacitance of the capacitor or capacitors that provide the capacitive coupling to the AC input voltage.

The range of 5 to 50 volts for the further predefined voltage has a lower bound that is the same absolute value as the predefined voltage and has an upper bound that is well within the low voltage range, such that no high-voltage components have to be used in the DC-DC converter.

It is to be noted that, if the voltage limiter is a zener diode, a practical value for the predefined voltage is −4.7 volts because of the availability of zener diodes of a specific voltage. If this is the case the further predefined voltage may have an absolute value in the range from 4.7 to 50 volts.

In another embodiment, the power supply system is arranged to operate either in a standby mode for providing standby power to the load or to operate in an operational mode for providing operational power to the load. The DC-DC converter comprises a buck-boost converter which comprises a controllable switch. In the operational mode, the controllable switch modulates a current through an inductance. The power supply system further comprises a controller to control the controllable switch. The switch is closed permanently in the standby mode of the power supply system such that the further voltage limiter is short-circuited via the inductance. The switch alternates between an open state and a closed state in the operational mode of the power supply system to control the storage of energy in the inductance and to control the release of energy from the inductance.

The buck-boost converter is a relatively inexpensive DC-DC converter with a relatively simple topology and a small amount of components. Buck-boost converters have the controllable switch in series with the inductance. The series arrangement of the controllable switch and the inductance is coupled between the second input and the neutral voltage level of the buck-boost converter. Thus, by closing the switch permanently, the second input is connected permanently to the neutral voltage level and the further voltage limiter is short-circuited effectively. As discussed in another embodiment this may be advantageous in the standby mode, because it reduces standby power losses in the further voltage limiter. Further, the permanent closing of the switch switches off the DC-DC converter because the voltage of the second input is reduced to zero effectively. If the controllable switch is controlled to alternate between the open state and the closed state, an inductance may store electrical energy when the switch is closed, and may release the energy when the switch is opened thereby providing a current to the output of the power supply system. Thus, the controller and the controllable switch, which are available in all buck-boost converters, have the additional function to short-circuit the further voltage limiter in the standby mode such that power losses in the further voltage limiter are prevented. Thus, no additional components are required and more energy is saved.

In another embodiment, the power supply system is arranged to operate either in a standby mode to provide standby power to the load or to operate in an operational mode to provide operational power to the load. The power supply system comprises a controller to control a controllable switch to disconnect the second input of the DC-DC converter from the capacitive coupling to the input in the standby mode.

Disconnecting the second input from the capacitive coupling to the input effectively results in the switching off of the DC-DC converter. The switching off of the DC-DC converter prevents power losses in the DC-DC converter during the standby mode. A branch of the power supply system comprising the rectifying circuit and the voltage limiter provides standby power and may be optimally dimensioned for the standby mode and in the operational mode the DC-DC converter may provide additional power to the output.

In an embodiment, the AC voltage received by the first input comprises an increasing-voltage part of the AC voltage wave and comprises a decreasing-voltage part of the AC voltage wave. The rectifying circuit rectifies only one of the increasing-voltage part or the decreasing-voltage part and the further rectifying circuit rectifies the another one of the increasing-voltage part or decreasing-voltage part.

The increasing-voltage part is the part of the AC voltage wave in which the voltage level increases. The decreasing-voltage part is the part of the AC voltage wave in which the voltage level decreases. The embodiment allows the use of one capacitor for the capacitive coupling wherein the capacitor provides a current to the rectifying circuit when the AC voltage is in either the decreasing-voltage part or in the increasing-voltage part and the capacitor provides the current to the further rectifying circuit in the other part. Thus, a minimum amount of components is required for the capacitive coupling.

In an embodiment, the power supply system comprises a capacitive coupling coupled between the first input and the rectifying circuit and being coupled between the first input and the further rectifying circuit. The capacitive coupling comprises a capacitor for providing the capacitive coupling.

Having one capacitive coupling allows the use of one capacitor. Thus, a minimum amount of components is required for the capacitive coupling.

In an embodiment, the further voltage limiter comprises an over-voltage-protection and a voltage limiting controllable switch. A first input of the over-voltage-protection is coupled to the second input and a second input of the over-voltage-protection is coupled to a predefined reference voltage. An output of the over-voltage-protection is coupled to the voltage limiting controllable switch for controlling the voltage limiting controllable switch to be either in a conducting mode or in a non-conducting mode. The voltage limiting controllable switch is coupled to a node shared by the capacitive coupling and the further rectifying circuit and is coupled to a neutral voltage of the power supply system.

The over-voltage-protection is in a practical embodiment a comparator with hysteresis. If the voltage of the second input is too high, the over-voltage-protection controls the voltage limiting controllable switch in a conducting mode, and no current is delivered via the further rectifying circuit to the second input, and as such the voltage level of the second input may decrease. If the voltage of the second input is too low, the over-voltage-protection controls the voltage limiting controllable switch in a non-conducting mode, and a current may be delivered via the further rectifying circuit to the second input, and as such the voltage level of the second input may increase. Further, when the voltage limiting controllable switch is closed, the capacitive coupling is coupled parallel to the AC voltage, and as such no power is dissipated in the capacitive coupling, which reduces the power losses of the power supply system.

In a further embodiment, the voltage limiter comprises an over voltage protection for detecting the rectified output voltage being too high and too low with respect to the predefined voltage. The further voltage limiter comprises a voltage limiting controllable switch. The voltage limiting controllable switch is coupled to a node shared by the capacitive coupling and the further rectifying circuit and is coupled to a neutral voltage of the power supply system. The voltage limiting controllable switch is controlled by the over voltage protection to be in the conducting state if the absolute value of the rectified output voltage is too high, and to be in the non-conducting state if the absolute value of the rectified output voltage is too low.

The embodiment controls the voltage level of the further rectified output voltage on basis of deviations of the rectified output voltage from the predefined voltage. If the voltage limiting controllable switch is controlled in the conducting state, the voltage level of the further rectified output voltage reduces and the amount of power delivered by the DC-DC converter to the output reduces and as such the voltage level of the rectified output voltage reduces. If the voltage limiting controllable switch is controlled in the non-conducting state, the voltage level of the further rectified output voltage increases and the amount of power delivered by the DC-DC converter to the output increases and as such the voltage level of the rectified output voltage increases. Thus, with a relatively small amount of components the voltage level of the rectified output voltage may be controlled to the predefined voltage without reducing the amount of power they may be delivered by the power supply system.

In an embodiment, the power supply system comprises a first capacitive coupling and a second capacitive coupling. The first capacitive coupling is coupled between the first input and the rectifying circuit and the second capacitive coupling is coupled between the first input and the further rectifying circuit. The first capacitive coupling and the second capacitive coupling each comprise a capacitor for providing the capacitive coupling.

Having separate capacitive couplings for the rectifying circuit and the further rectifying circuit allows the optimization of the capacitance of the capacitors of each one of the capacitive coupling means for the specific power requirements of specific branches of the power supply systems. As such it provides an additional variable that may be tuned to lower power losses.

In a further embodiment, the capacitive coupling, the first capacitive coupling, and/or the second capacitive coupling comprises (i) a surge resistor coupled in series with the capacitor and/or (ii) a bleed resistor coupled in parallel to the capacitor.

The surge resistor protects the power supply system against sudden changes in the AC voltage and the bleed resistor discharges the capacitor when the AC voltage is absent.

In another embodiment, the power supply system comprises an integrated circuit which comprises at least one of the group of: at least a part of the DC-DC converter, the voltage limiter, the further voltage limiter, the short-circuiting controllable switch, the controller for controlling the short-circuiting controllable switch, at least a part of the buck-boost converter, the controllable switch of the buck-boost converter, a diode of the buck-boost converter, a further diode of the buck-boost converter for providing power to a further power rail, the controller for controlling the controllable switch of the buck-boost converter, a current limiting circuit for limiting the current through the voltage limiter, and a further current limiting circuit for limiting the current through the further voltage limiter.

Integrating a large part of the power supply system on the integrated circuit (IC) leads to, when the IC is manufactured in large amounts, a relatively cheap power supply system. Further, it is relatively cheap to integrate a more advanced controlling mechanism for the buck-boost converter in the IC without increasing the costs a lot. A further advantage of the IC is that the IC has relatively small physical dimensions.

In a further embodiment of the power supply system, the voltage limiter comprises a shunt regulator with a control loop formed by a series arrangement of two resistors and/or the further voltage limiter comprises a further shunt regulator with a control loop formed by a further series arrangement of two resistors.

The integration of the shunt regulator with the control loop and the further shunt regulator with the control loop on the IC is relatively easy and relatively cheap. For example, zener diodes are typically not available in IC technology and a shunt regulator with a control loop is thus an advantageous alternative for a zener diode.

According to a second aspect of the invention an electronic device is provided which comprises a power supply system according to the first aspect of the invention.

The electronic device provides the same benefits as the power supply system according to the first aspect of the invention and has similar embodiments with similar effects as the corresponding embodiments of the system.

According to a third aspect of the invention an electronic device is provided which comprises a device controller to control an operation of the electronic device to control the electronic device to be in a standby mode or in an operational mode. The electronic device further comprises a power supply system according to the first aspect of the invention which is arranged to operate either in a standby mode for providing standby power to a low voltage load or to operate in an operational mode for providing operational power to the low voltage load. The DC-DC converter of the power supply system comprises a buck-boost converter which comprises a controllable switch. The controllable switch modulates a current through an inductance. The power supply system further comprises a power supply controller to control the controllable switch. The power supply controller is arranged to control the controllable switch. The switch is permanently closed in the standby mode of the power supply system such that the further voltage limiter is short-circuited via the inductance. The switch alternates between an open state and a closed stated in the operational mode of the power supply system to control the storage of energy in the inductance and to control the release of energy from the inductance. The device controller and the power supply controller of the power supply system are integrated in one controller.

The electronic device provides the same benefits as the power supply system according to the first aspect of the invention and has similar embodiments with similar effects as the corresponding embodiments of the system. By combining the controller of the electronic device and the power supply system an additional advantage of the use of less components in the electronic device is obtained which reduces complexity and costs.

According to a fourth aspect of the invention, a controller is provided for use in the power supply system according to the first aspect of the invention or for used in an electronic device according to the third aspect of the invention.

These and other aspects of the invention are apparent from and will be elucidated with reference to the embodiments described hereinafter.

It will be appreciated by those skilled in the art that two or more of the above-mentioned embodiments, implementations, and/or aspects of the invention may be combined in any way deemed useful.

Modifications and variations of the system and/or of the device which correspond to the described modifications and variations of the system, can be carried out by a person skilled in the art on the basis of the present description.

Figure 1:
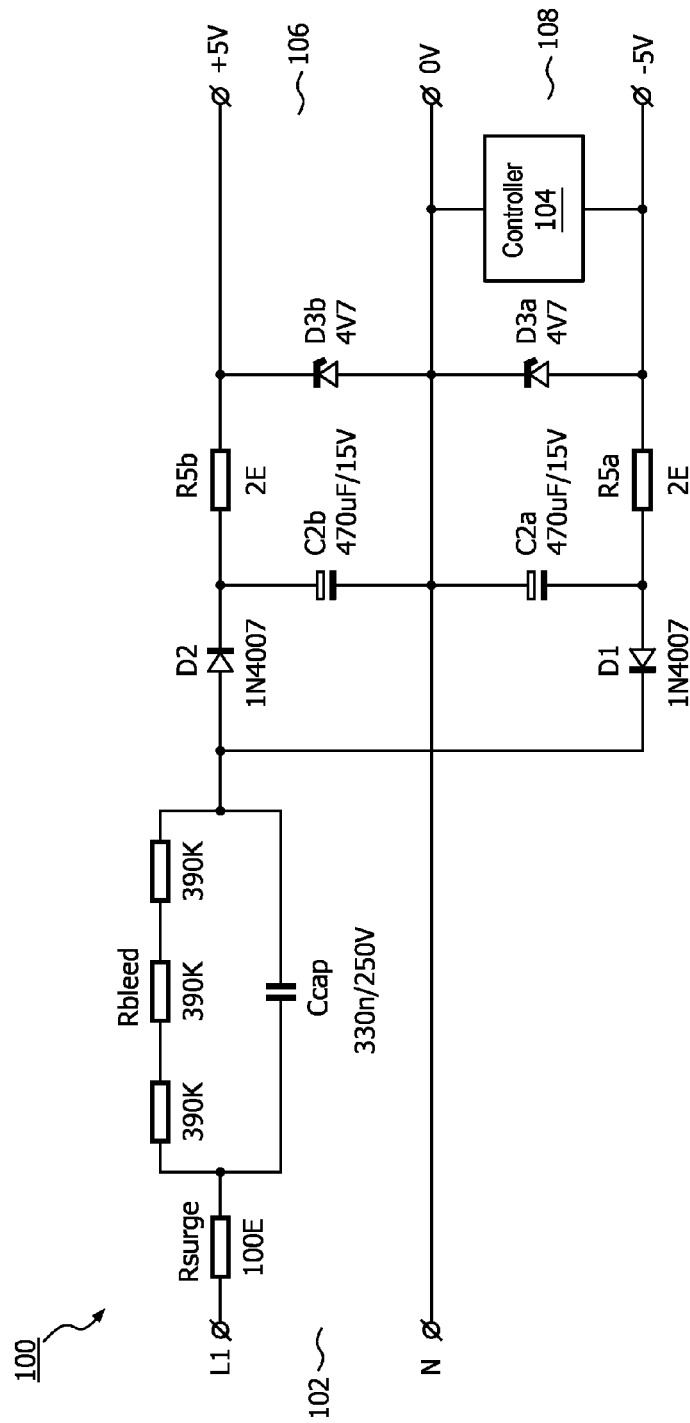
FIG. 1 schematically shows a full-wave capacitive supply.

It should be noted that items denoted by the same reference numerals in different Figures have the same structural features and the same functions, or are the same signals. Where the function and/or structure of such an item have been explained, there is no necessity for repeated explanation thereof in the detailed description.

The values of the electronic components shown in the figures are only examples of the presented embodiments. If the shown circuit has to operate differently, the values may be changed accordingly.

DETAILED DESCRIPTION

FIG. 1 shows a known full-wave capacitive power supply 100. Input 102 receives an AC mains voltage of 230 volts. Resistor $R_{surge}$ is used to make the circuit less sensitive to mains voltage disturbances like surges and voltage dips. Capacitor $C_{cap}$ provides a capacitive coupling between the mains voltage and the power supply. The resistor $R_{bleed}$ is used for discharging $C_{cap}$ when the full-wave capacitive power supply 100 is disconnected from the mains voltage and as such the time constant $R_{bleed}C_{cap}$ is limited to a maximum value and typically kept constant. Diode D2 conducts a current when the voltage level of the input AC-wave increases and charges capacitor C2b. The voltage across capacitor C2b is provided via an additional surge resistor R5b to a first output 106. Zener diode D3b limits the output voltage of the first output 106. Diode D1 conducts a current when the voltage level of the input AC-wave decreases and charges capacitor C2a. The voltage across capacitor C2a is provided via another additional surge resistor R5a to the second output 108 and zener diode D3a limits the output voltage of the second output 108. The output voltage of the first output 106 is substantially equal to +5 volts, and the output voltage of the second output 108 is substantially equal to −5 volts.

The known full-wave capacitive power supply 100 is often used in an electronic device which primary operation is controlled by a controller 104. The controller 104, for example, controls a triac which connects or disconnects the mains voltage circuitry of the electronic device to or from the mains voltage. The triac requires less gate current if the controller 104 runs on a negative voltage as shown in the figure. The controller 104 may further be used to switch the mode of the electronic device between a standby mode and an operational mode. In the standby mode the controller 104 is only used to detect a so-termed switch-on signal which may be received from a push button or a remote control. If such a signal is received by the controller 104, other parts of the electronic device are switched by the controller 104 to an operational mode.

The current that may be delivered via the first output 106 is:

$$I_{out} = \bar{I} = \frac{|I_{mains}|}{\pi} = 2 \cdot f_{mains} \cdot U_{mains} \cdot C_{cap} \quad (1)$$

and the output power that may be delivered via the first output 106 is:

$$P_{out} = \bar{I} \cdot U_{out} = 2 \cdot f_{mains} \cdot U_{mains} \cdot U_{zener} \cdot C_{cap} \quad (2)$$

The power that may be delivered via the second output 108 is also substantially equal to (2). In the standby mode no load is connected to the first output 106 and only a very small current is drawn by the controller 104 from the second output 108. However, the full-wave power supply 100 consumes more energy than the power consumption of the controller. The standby power of the full wave capacitive power supply 100 is substantially equal to (thereby neglecting the power dissipation in diodes $D_1$ and $D_2$ and surge resistors R5a and R5b):

$$P_{standby} \approx P_{range} + P_{Rbleed} + P_{zener1} + P_{zener2}, \quad (3)$$

where:

$$P_{Rsurge} = \frac{1}{2} \cdot |I_{mains}|^2 \cdot R_{surge} = 2 \cdot (\pi \cdot f_{mains} \cdot U_{mains} \cdot C_{cap})^2 \cdot R_{surge}, \quad (4)$$

$$P_{Rbleed} = \frac{1}{2} \cdot \frac{|U_{mains}|^2}{R_{bleed}} \propto \frac{1}{2} \cdot |U_{mains}|^2 \cdot C_{cap}, \quad (5)$$

$$P_{zener1} = P_{zener2} = \overline{I} \cdot U_{out} = P_{out} = 2 \cdot f_{mains} \cdot U_{mains} \cdot U_{zener} \cdot C_{cap}. \quad (6)$$

Note that, in the standby mode, the maximum output power $P_{out1} + P_{out2}$ is simply dissipated in the zener diodes $D_{3a}$, $D_{3b}$. Further, it is to be noted that the power dissipation in the surge resistor $R_{surge}$ and the series arrangement of bleed resistors $R_{bleed}$ have a quadratic and linear relation, respectively, with the capacitance of the capacitor $C_{cap}$.

It is to be noted that the controller 104 of FIG. 1 draws power from the second output 108. Other components of the electronic device may draw power from the first output 106 and/or the second output 108. In cases where only one output is required with a voltage difference of, for example, 5 volt, the output voltage of the first output 106 and the output voltage of the second voltage may be lowered to 2.5 and −2.5 volt, respectively, and the controller 104 and the load of the electronic device have to be connected between the two output terminals with these respective voltages. However, this requires an increase of the capacitance of the capacitor $C_{cap}$ because a higher current has to be delivered when the total amount of deliverable power has to remain the same. As such, it leads to higher standby power losses.

Figure 2:
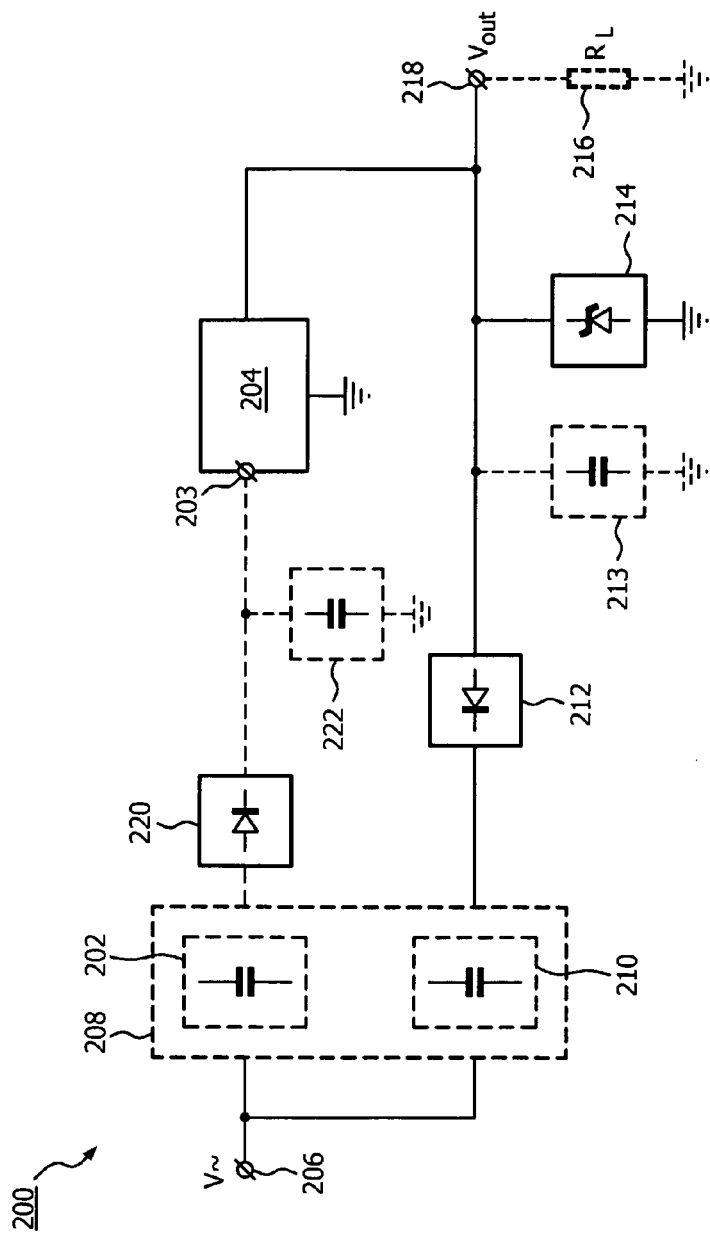
FIG. 2 schematically shows an embodiment of the power supply system according to the first aspect of the invention, FIG. 3 schematically shows another embodiment of the power supply system according to the invention, FIG. 4 schematically shows an embodiment of the power supply system comprising a buck-boost converter.

FIG. 2 shows an embodiment according to the first aspect of the invention. A power supply system 200 is shown. The power supply system 200 comprises a first input 206 which receives an AC voltage and comprises an output 218 which provides an output voltage to a load 216. The power supply system 200 further comprises a DC-DC converter 204, which comprises a second input 203, a rectifying circuit 212 and a voltage limiter 214. The rectifying circuit 212 is capacitively coupled to the first input and provides a rectified voltage to the output 218. The voltage limiter 214 is coupled to the output 218 and limits the output voltage to a predefined voltage. The second input 203 of the DC-DC converter is capacitively coupled to the first input 206 and provides power to the output 218. The capacitive coupling is provided by separated capacitive coupling means 202 and 210, or by a shared capacitive coupling means 208.

As discussed at FIG. 1, if only one output voltage has to be provided to the output of the known full-wave capacitive power supply 100 with the same output power, the capacitance of the capacitor has to be increased. This is not required with the power supply system of FIG. 2. If, for example, the predefined voltage is −5 volt and at the second input 203 another voltage is received, the DC-DC converter may convert the power available at its second input 203 to a power which matches the requirements of the output 218. As such, the capacitance of the capacitor(s) of the capacitive coupling does not have to be increased. Thus, the standby power losses do not have to be increased. Thus, the power supply system 200 operates efficiently, especially in the standby mode.

In a practical embodiment of the system of FIG. 2 an energy reservoir 213 is coupled to the output. The rectifying circuit 212 provides energy to the energy reservoir such that a substantially stable DC voltage is obtained at the output. In a further practical embodiment of FIG. 2 a further energy reservoir 222 is coupled to the second input 203 and a further rectifying circuit 220 is coupled in between the capacitive coupling 202 or 208 and the first input for providing a further rectified voltage to the second input 203.

Figure 3:
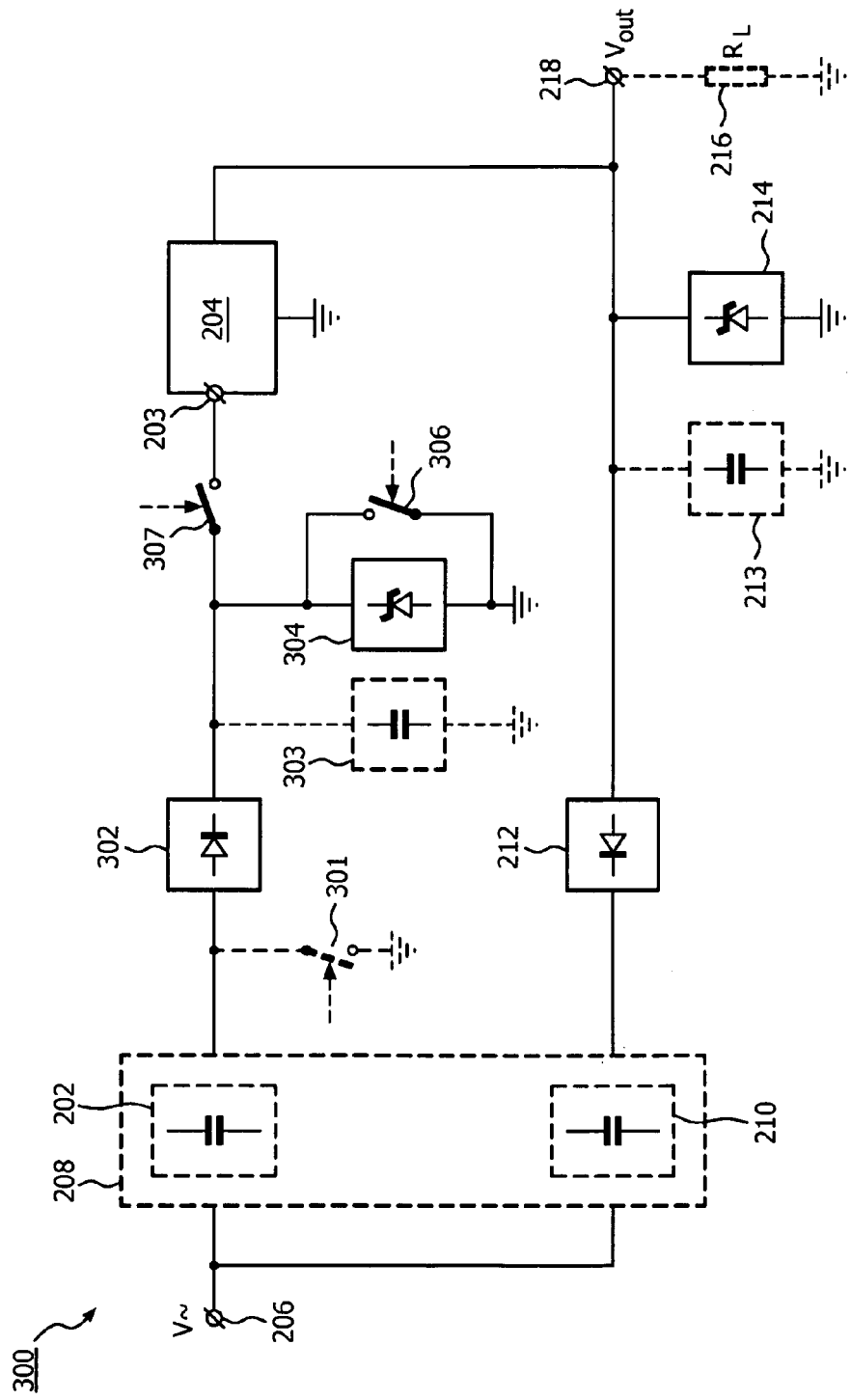

FIG. 3 shows another embodiment according to the first aspect of the invention. A power supply system 300 is shown which comprises in addition to the elements of power supply system 200, a further rectifying circuit 302, a further voltage limiter 304, an optional controllable switch 306, and an optional further controllable switch 307. The further rectifying circuit 302 is capacitively coupled to the AC voltage that is received by the input 206 and provides a rectified voltage to the second input 203. A further voltage limiter 304 is also coupled to the second input 203 and limits the voltage of the second input 203 to a further predefined voltage. Controllable switch 306 is coupled to the second input 203 and is arranged parallel to the further voltage limiter 304 for short-circuiting the further voltage limiter 304 in a standby mode of the power supply system 300. In a standby mode the power supply system 300 provides standby power to the load 216 via the output 218. In an operational mode the power supply system 300 provides operational power to the load 216.

If controllable switch 306 is open, the voltage at the second input 203 of the DC-DC converter 204 is limited by the further voltage limiter 304. The power that may be delivered via the DC-DC converter to the output 218 substantially equals $$P_{out} = \overline{I} \cdot U_{2nd} \quad input = 2 \cdot f_{AC} \cdot U_{AC} \cdot U_{further\ predefined\ voltage} \cdot C_{cap} \quad (7)$$

wherein $C_{cap}$ represents the capacitance of the capacitor that provides the capacitive coupling of the further rectifying circuit 302 to the input 206. As may be seen in formula (7), the capacitance of the capacitor may be reduced when the further predefined voltage is increased. As discussed at FIG. 1, all the standby power losses have a quadratic or linear relation with the capacitance of the capacitor. Thus, by increasing the further predefined voltage, the capacitor of the capacitor of the capacitive coupling may be decreased, and as such the standby power losses are reduced.

A further reduction of the standby losses may be obtained by short-circuiting the further voltage limiter with the controllable switch 306. Effectively it results in the coupling the capacitor of the capacitive coupling in parallel to the input AC voltage. A capacitor in parallel to an AC voltage does not dissipate any power. Furthermore, the further voltage limiter 304 can not dissipate power, because both terminals of the further voltage limiter 304 receive the same voltage. Thus, as may be seen in formula (3), the standby power reduces with the amount of power that would be dissipated in the further voltage limiter 304. Further, by closing the controllable switch 306 the voltage of the second input 203 is effectively reduced to zero. Thus, the DC-DC converter 204 is effectively switched off and can not dissipate any power.

In another embodiment, the second input 203 of the DC-DC converter 204 may be disconnected from the further rectifying circuit 302 by means of the further controllable switch 307. Disconnecting the second input 203 of the DC-DC converter 204 results in the switching off of the DC-DC converter 204 which reduce possible power losses in the DC-DC converter 204. Especially in the standby mode of the power supply system 300 the further controllable switch 307 has to be opened. In an alternative embodiment, the DC-DC converter 204 comprises a means for switching off the DC-DC converter 204. Commercially available DC-DC converters have often such a means.

In a practical embodiment of the system of FIG. 3 an energy reservoir 213 is coupled to the output having the same function as energy reservoir 213 from FIG. 2, and a further energy reservoir 303 is coupled to a node to which the further rectifying circuit provides the rectified voltage, such that the further energy reservoir may store energy to obtain a substantially stable DC voltage.

In another embodiment of the system of FIG. 3 a controllable switch 301 is provided which is coupled between the neutral voltage and a node in between the capacitive coupling and the further rectifying circuit 302. The standby power may also be reduced by closing the controllable switch 301 in the standby mode because it results in connecting the capacitor of the capacitive coupling parallel to the AC voltage.

Figure 4:
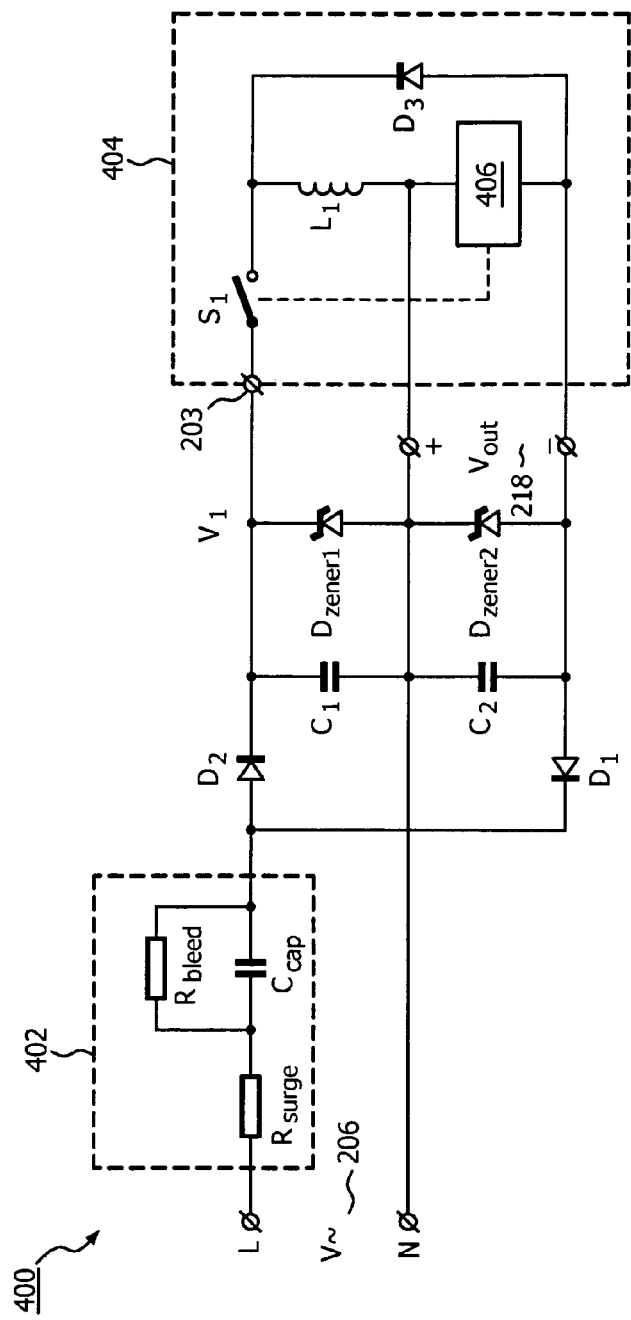

In FIG. 4 another embodiment of the power supply system 400 according to the first aspect of the invention. The power supply system 400 comprises an input 206 for receiving a mains voltage and comprises an output 218 for providing a DC output voltage $V_{out}$ to a low voltage circuitry of, for example, an electronic device. The power supply system 400 comprises a capacitive coupling means 402 which comprises a capacitor $C_{cap}$, a surge resistor $R_{surge}$ arranged in series with the capacitor $C_{cap}$ and a bleed resistor $R_{bleed}$ arranged parallel to the capacitor $C_{cap}$. Diode $D_2$ conducts a current when the voltage level of the mains input voltage wave increases and stores electrical energy in capacitor $C_1$. A zener diode $D_{zener1}$ is connected in parallel to the capacitor $C_1$ and limits the voltage across the capacitor $C_1$ to the predefined voltage $V_1$. The limited voltage is provided to a second input 203, which is an input of a DC-DC converter 404. The DC-DC-converter 404 of power supply system 400 is a buck-boost converter which comprises a controllable switch $S_1$, an inductance $L_1$, a free wheeling diode $D_3$ and a controller 406. The power supply system 400 further comprises a diode $D_1$ which conducts a current when the voltage level of the mains input voltage wave decreases and stores electrical energy in capacitor $C_2$. Capacitor $C_2$ provides an output voltage $V_{out}$ to the output 218. The output voltage is limited to the predefined output voltage $V_{out}$ by a zener diode $D_{zener2}$ which is coupled parallel to capacitor $C_2$.

The buck-boost converter 404 converts voltage $V_1$ to voltage $V_{out}$. The controllable switch $S_1$ may be controlled in an open state and a closed state. The controller 406 controls the controllable switch $S_1$ to alternate between the open and the closed state. At a specific frequency and with a specific duty cycle voltage $V_1$ is converted into $V_{out}$. When switch $S_1$ is closed a current through the inductance $L_1$ gradually increases. Switch $S_1$ is opened when enough energy is stored in the inductance. When the switch $S_1$ is opened, the stored energy in the inductance $L_1$ causes a current through diode $D_3$ which gradually decreases. For example, when the current through diode $D_3$ is substantially equal to zero, the switch $S_1$ may be closed and the cycle of opening and closing the switch is repeated.

The controller 406 may additionally be used to control the power supply system 400 to operate in a standby mode or in an operational mode. In the standby mode controllable switch $S_1$ is closed permanently, and in the operational mode controllable switch $S_1$ is controlled to alternate between the open state and the closed state. The switch $S_1$ of the buck-boost converter 404 is used for short-circuiting the zener diode $D_{zener1}$ in the standby mode. If switch $S_1$ is permanently closed, the zener diode $D_{zener1}$ is short-circuited via the inductance $L_1$. As discussed before, short-circuiting the zener diode $D_{zener1}$ prevents power losses in the zener diode $D_{zener1}$ in the standby mode. In a further embodiment, the controller 406 may be a general purpose programmable controller which is also able to control an electronic device which comprises the power supply system 400, for example, to control the primary operation of the electronic device.

Figure 5:
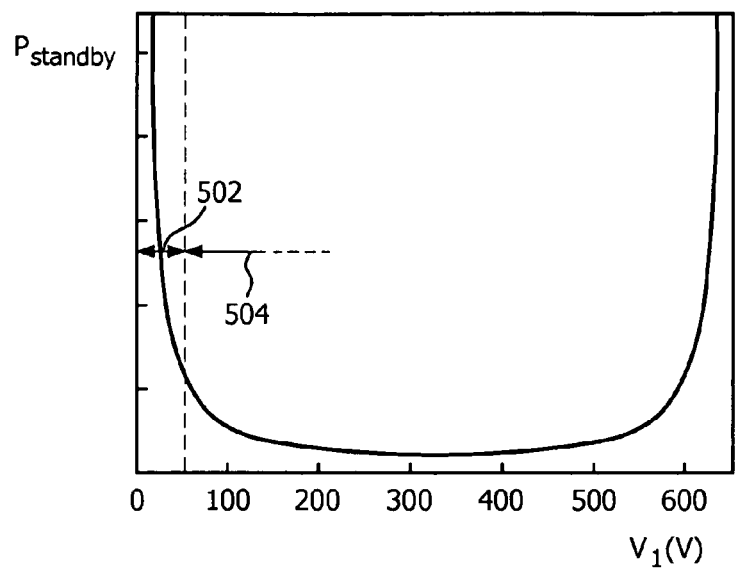
FIG. 5 presents a chart of the standby losses as a function of the further predefined voltage, FIG. 6a schematically shows a specific embodiment of the power supply system according to the invention, FIG. 6b schematically shows in a chart some of the signals of the specific embodiment of FIG. 6a, FIG. 7 schematically shows another specific embodiment of the power supply system according to the invention, FIG. 8 schematically shows an electronic device comprising the power supply system of the invention, FIG. 9a schematically shows an embodiment of the power supply system comprising an IC, FIG. 9b schematically shows an embodiment of a shunt regulator, FIG. 10 schematically shows an embodiment of the power supply system comprising an IC which comprises a current limiting circuit, FIG. 11 schematically shows an embodiment of the power supply system comprising an IC which comprises a voltage limiting controllable switch, FIG. 12 schematically shows an embodiment of the power supply system comprising an IC, FIG. 13 schematically shows an embodiment of the power supply system comprising an IC which comprises a fixed ton controlling mechanism for the buck-boost converter, FIG. 14 schematically shows an embodiment of the power supply system comprising an IC which comprises another controlling mechanism for the buck-boost converter, FIG. 15 schematically shows an embodiment of the power supply system comprising an IC which comprises a controlling of the further rectified voltage level in dependence of the voltage level of the rectified output voltage, FIG. 16 schematically shows an embodiment of the power supply system comprising an IC which has a MOS transistor instead of a diode of the buck-boost converter, and FIG. 17 schematically shows an embodiment of the power supply system comprising an IC which provides power to an additional power rail.

In an embodiment of power supply system 400 the predefined voltage $V_1$ is higher than the predefined output voltage $V_{out}$. If $V_1$ is higher, the standby losses may be prevented because of the possibility to use a capacitor $C_{cap}$ with a smaller capacitance for the capacitive coupling. This result in the reduction of losses in the surge resistor $R_{surge}$, the bleed resistor $R_{bleed}$ and, depending on the state of controllable switch $S_1$, in the zener diode $D_{zener1}$. In FIG. 5 a chart is presented in which the relation between the predefined voltage $V_1$ and the standby power dissipation if the power supply system 400 is dimensioned for a specific fixed maximum amount of output power. As may be seen the standby losses decrease dramatically in a range, indicated with reference number 502, from 0 to about 50 volts. In another range, indicated with reference number 504, above 50 volts the losses may further decrease, however, if the buck-boost converter 404 receives a voltage at the second input 203 which is higher than 50 volts, at least the controllable switch $S_1$ must be manufactured with a high-voltage process such that the controllable switch $S_1$ is able to withstand the higher voltages. Other components, like the inductance $L_1$, may become more expensive as well. Thus, the predefined voltage $V_1$ in the range 502 up to 50 volt provides benefits. A lower bound for the predefined voltage $V_1$ is the output voltage $V_{out}$ which is defined by the voltage of zener diode $D_{zener2}$.

Figure 6A:
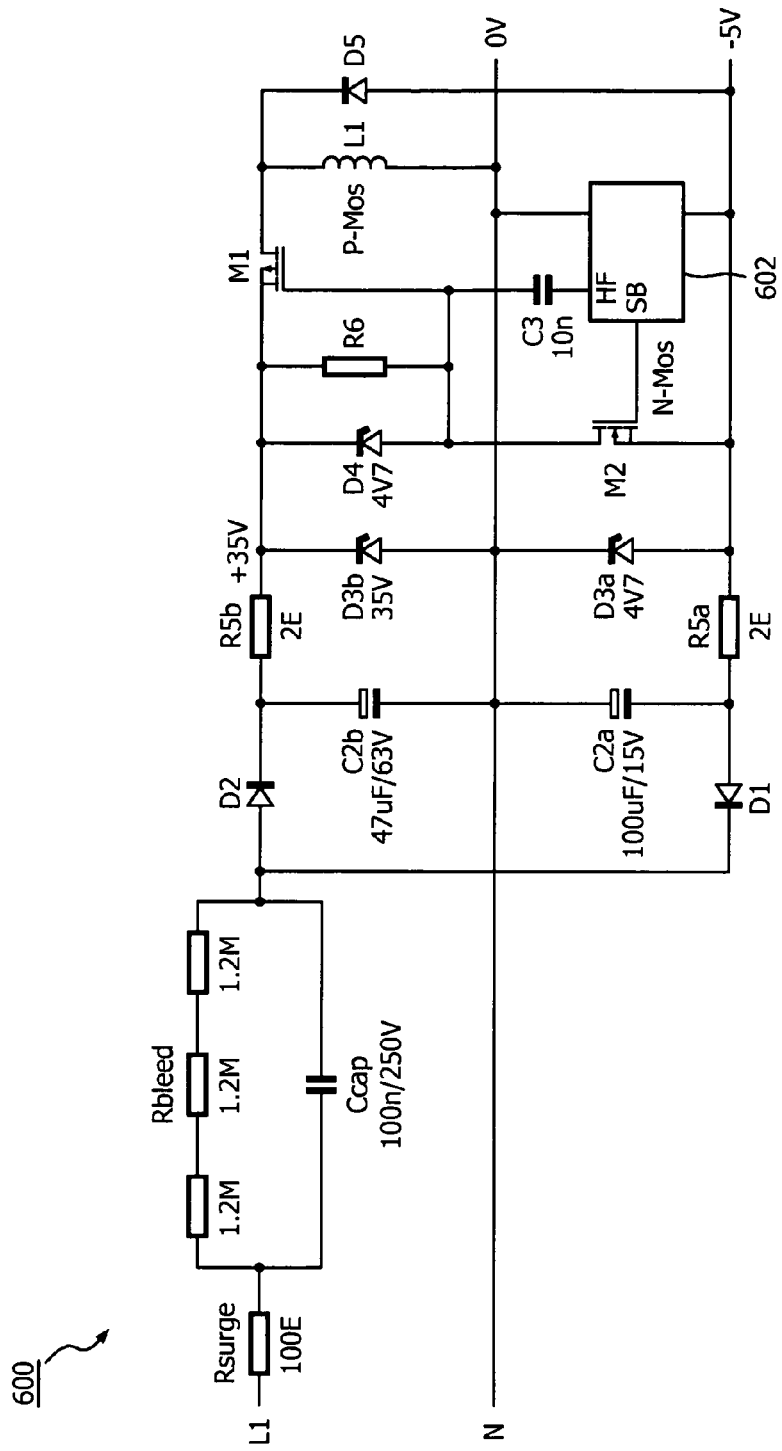

FIG. 6a shows a specific embodiment of the power supply system according to the first aspect of the invention. The shown power supply system 600 is dimensioned to provide an output voltage of −4.7 volt at a maximum output current of −27.5 mA, thus a maximum output power is $P_{out}$=129 mW. The function of $R_{surge}$, $R_{bleed}$, $C_{cap}$, $D_1$, $D_2$, $C_{2a}$, $C_{2b}$, $D_{3a}$, $D_{3b}$, $L_1$ and $D_5$ has been discussed previously in the context of the embodiment of FIG. 4. Zener diode $D_{3a}$ limits the output voltage to −4.7 volt, and zener diode $D_{3b}$ limits the voltage that is provided to the buck-boost converter to 35 volts. Additional surge resistors $R_{5b}$ and $R_{5a}$ are added to protect the zener diodes $D_{3a}$ and $D_{3b}$ for sudden changes in the voltages across capacitors $C_{2a}$ and $C_{2b}$, respectively. In the power supply system 600 the buck-boost converter has a different controller 602 and a different topology around the controllable switch $M_1$ compared to the embodiment of FIG. 4.

Controllable switch $M_1$, which is realized with a P-MOS transistor, modulates the current through inductance $L_1$. Further, controllable switch $M_1$ is used to short-circuit zener diode $D_{3b}$ through the inductance $L_1$ in the standby mode. Controllable switch $M_1$ is controlled by the controller 602.

The controller has two output nodes, namely SB and HF. In the standby mode the signals of the output nodes SB and HF are high. The high SB signal switches controllable switch $M_2$, which is realized as an N-MOS transistor, to a conducting state, and consequently switches controllable switch $M_1$ to the conducting state as well. $M_1$ is conducting because the gate of the $M_1$ is connected to −5 volt which is at least 5 volts lower than the source voltage of $M_1$. Zener diode $D_4$ makes sure that, if the voltage difference between the source voltage of $M_1$ and the gate of $M_1$ is higher than 4.7 volt, and if $M_2$ is in the conducting state, a current through zener diode $D_4$ discharges capacitor $C_{2b}$ until the source voltage of $M_1$ is 4.7 volts higher than the gate voltage of $M_1$. In the operational mode of the power supply system 600, signal SB is low, and signal HF alternates between low and high. Thus, in the operation mode controllable switch $M_2$ is in the non-conducting state. To switch controllable switch $M_1$ to the non-conducting state in the operation mode, the voltage at the gate of $M_1$ has to be equal to, or higher than, the voltage of the source of $M_1$. Initially, just after switching $M_2$ to the non-conducting state, resistor $R_6$ makes the voltage difference between the source and the gate of $M_1$ smaller such that $M_1$ switches to the non-conducting state.

To switch controllable switch $M_1$ to the conducting state in the operational mode, the voltage at the gate of $M_1$ has to be lower than the voltage of the source of $M_1$. The controller is only able to deliver a voltage between −5 and 0 volts at its output node HF, and as such the gate of $M_1$ can not be driven directly from the controller 602, because a direct between output node HF and the gate of the controllable switch $M_1$ results in a permanently closed controllable switch $M_1$. To drive the controllable switch $M_1$, a charge-pump circuitry is added with capacitor $C_3$ and zener diode $D_4$. The circuitry is based on the fact that the voltage across capacitor $C_3$ can not change in a short time. To switch-on the controllable switch $M_1$, the output node HF of the controller 602 is made low and as a consequence the voltage at the gate of $M_1$ is made lower than the source voltage. When the output node HF of the controller 602 is made high, the voltage of the gate of $M_1$ increases up to, or to a level above, the voltage at the source of $M_1$. In other words, the capacitor $C_3$ is used to compensate for the voltage differences at between the input voltage of the buck-boost converter (between 0 and 35 volts) and the voltage that may be delivered by the controller 602 (between −5 and 0 volts). It is to be noted that the time constant defined by resistor $R_6$ and $C_3$ has to be large enough to prevent the too early switching of $M_1$ to the non-conducting state as a result of a current through $R_6$ which reduces the voltage difference between the gate and the source of $M_1$.

Figure 6B:
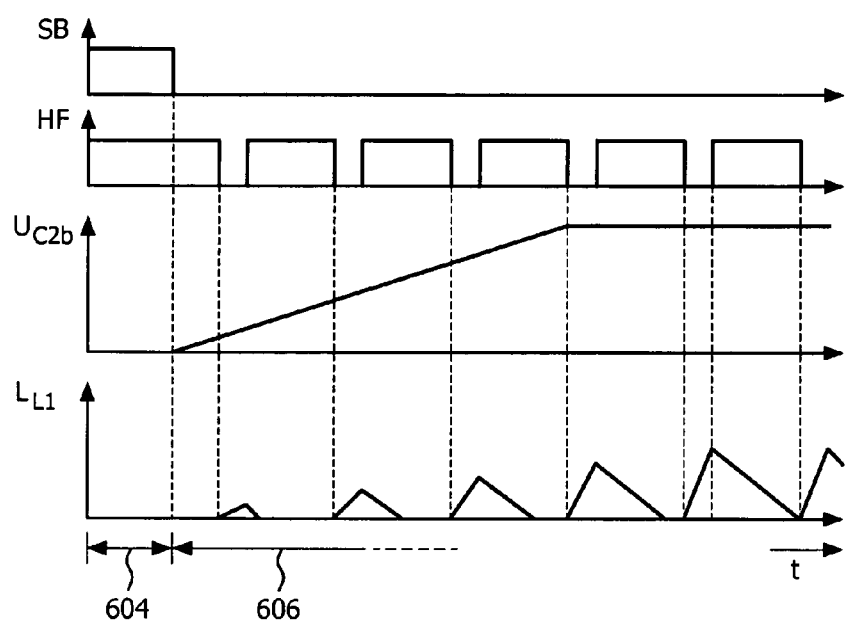

In FIG. 6b the signals of SB and HF are drawn as a function of time. The time interval indicated with reference number 604 represents the standby mode of the power supply system 600. The time interval indicated with reference number 606 represents the operational mode. Further the chart shows the voltage across capacitor $C_{2b}$ and the current through inductance $L_1$ as a function of time. In the standby mode, signals SB and HF are high and consequently controllable switches $M_1$ and $M_2$ are in the conducting mode. Thus, capacitor $C_{2b}$ is completely discharged via inductance $L_1$ resulting in a voltage across $C_{2b}$ that is substantially equal to zero. When the power supply system 600 enters the operational mode, signal SB becomes low. Consequently, controllable switch $M_2$ opens and as the result of the current through $R_6$, controllable switch $M_1$ opens as well. Thus, the voltage across $C_{2b}$ starts to increase. When, subsequently, the signal HF is reduced to the lower voltage, controllable switch $M_1$ switches to the conducting state and as such an increasing current starts to flow through $L_1$ and energy is stored in the inductance $L_1$. As soon as signal HF becomes high, controllable switch $M_1$ is switched to the non-conducting state, and the energy stored in the inductance draws a current through $D_3$. Consequently, the energy stored in the inductance $L_1$ reduces and as such the current through the inductance $L_1$ reduces. During the first cycles of opening and closing controllable switch $M_1$ the voltage across capacitor $C_{2b}$ does not reach its maximum level. As such, the current through the inductance $L_1$ doesn't reach its maximum. However, from the moment that the voltage across capacitor $C_{2b}$ reaches a stable level, as a result of the voltage limiting effect of zener diode $D_{2b}$, the buck-boost converter reaches a stable operation wherein the input voltage of the buck-boost converter is converted into the output voltage.

Figure 7:
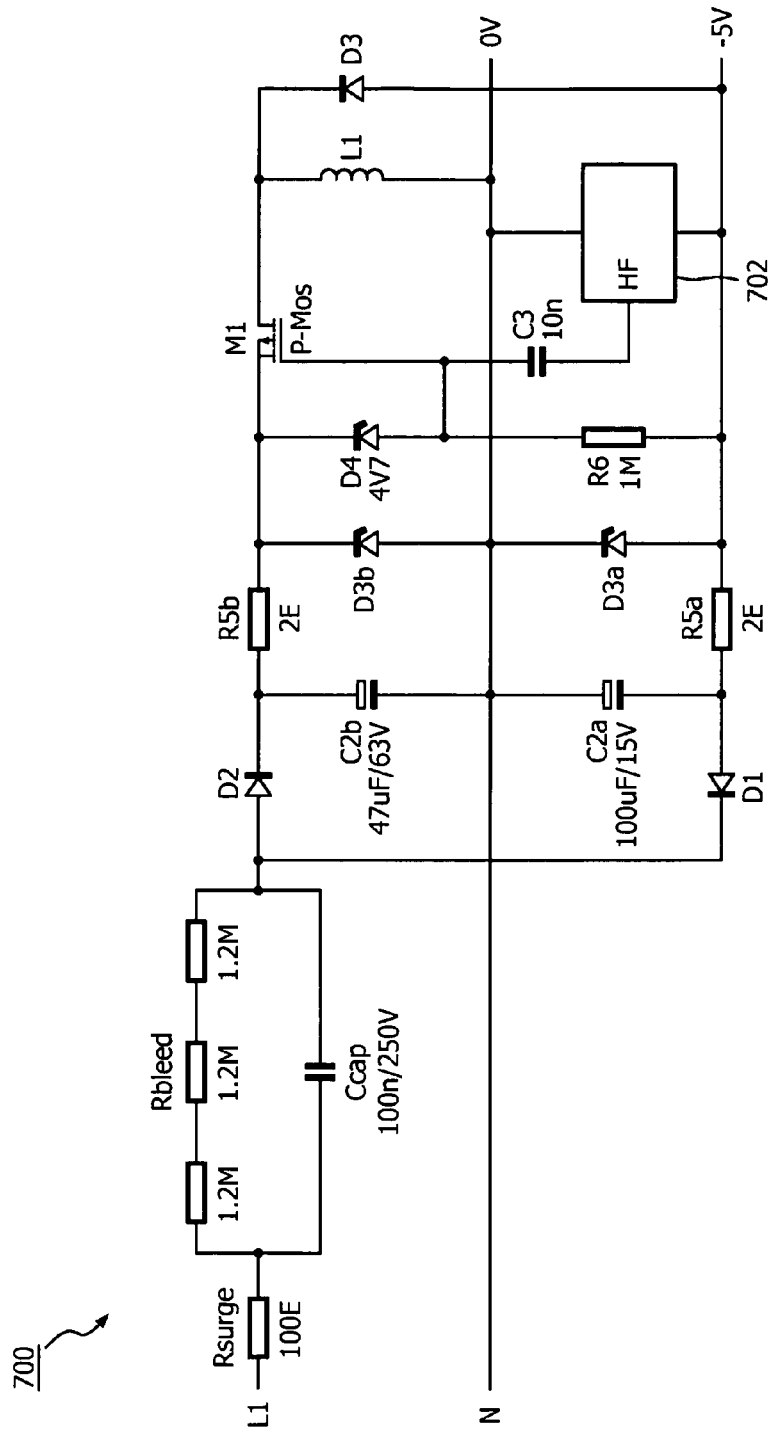

FIG. 7 presents another embodiment of the power supply system according to the first aspect of the invention. Power supply system 700 is similar to power supply system 600, however, the controlling of the controllable switch $M_1$ by the controller 702 is different. The controller 702 has only one output node providing a signal HF. Instead of controllable switch $M_2$ of the power supply system 600, resistor $R_6$ is provided. A current through $R_6$ reduces the voltage difference between the gate of $M_1$ and the −5 volt output such that the gate voltage of controllable switch $M_1$ is lower than its source voltage. If the output signal HF is stable for some time, the gate voltage of controllable switch $M_1$ is lower than the source voltage of $M_1$ and as such the controllable switch $M_1$ enters the conducting state after some time. Thus, in the standby mode the signal HF is stable for some time. In the operational mode the signal HF has to increase such that the voltage at the gate of $M_1$ increases as well and controllable switch $M_1$ enters the non-conducting state. Subsequently, $R_6$ gradually increases the voltage difference between the gate of $M_1$ and its source and, consequently, $M_3$ may switch to the conducting state either automatically after a time period which depends on a time constant defined by $R_6$ and $C_3$, or because of the signal HF which decreases to a lower value such that the voltage at the gate of $M_1$ decreases at the instant that the signal HF drops.

Figure 8:
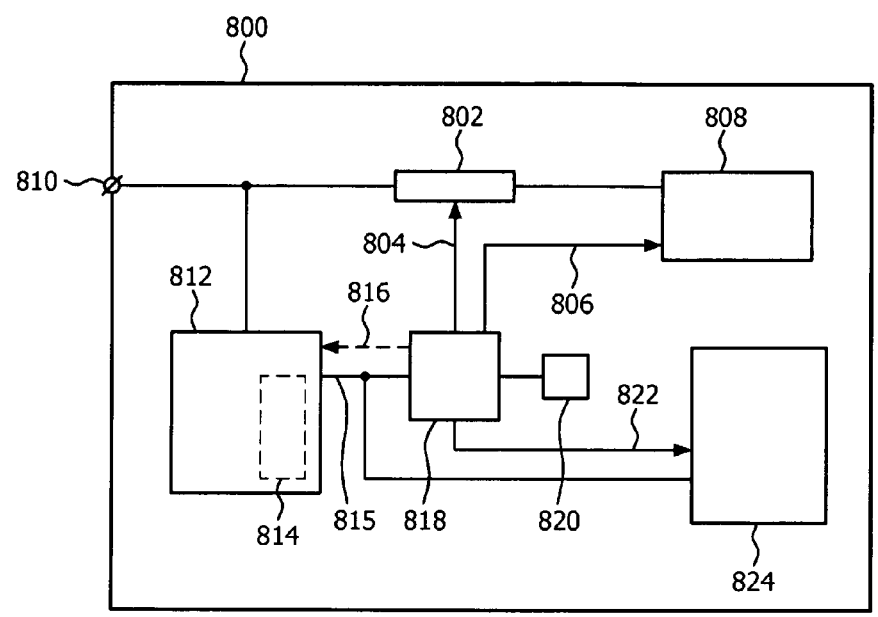

FIG. 8 shows an electronic device 800 according to the second and/or the third aspect of the invention. The electronic device 800 has an input 810 for receiving the mains voltage. A part of the electronic device operates with the mains voltage, which is called the mains voltage circuitry 808. The mains voltage circuitry 808 is connected and disconnected from the input 810 by a triac 802. The mains voltage is also received by a power supply system 812 according to the first aspect of the invention. The power supply system 812 provides power at a low voltage 815 to an electronic device controller 818 and optional to a low voltage circuitry 824, which provides for example a user interface to the user of the electronic device 800. The power supply system 812 may comprise a power supply controller 814 or may be controlled by a control signal 816 received from the device controller 818. The device controller 818 is further connected to a switch on/off device 820 which detects whether the user provides a switch on command or a switch off command. The user command may be received by a push button, a remote control detector or another means to receive user input. In response to the detected switch on command or in response to the detected switch off command the triac 802 is controlled with a triac control signal 804 to the conducting or non-conducting state, respectively, is the low power circuitry controlled with a low power circuitry control signal 822 to be in the on or off state, respectively, and the power supply system 812 is optionally controlled to be in the standby mode or in the operational mode by the control signal 816. Further, when the electronic device 800 is switched on, the controller 818 controls the primary operation of the mains voltage circuitry 808 by means of a high voltage circuitry control signal 806. It is to be noted that instead of a triac 802 other mains voltage switching means may be used instead of triac 802—an example is a relay.

Figure 9A:
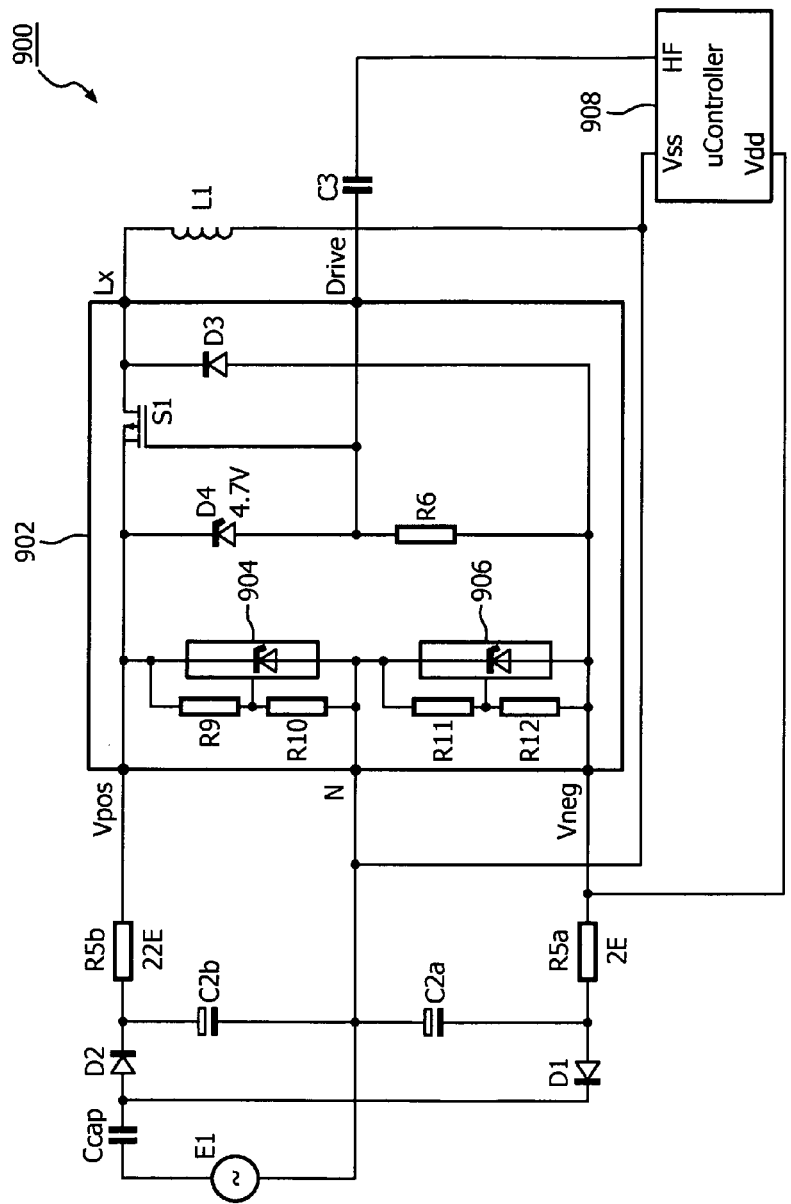
Figure 9B:
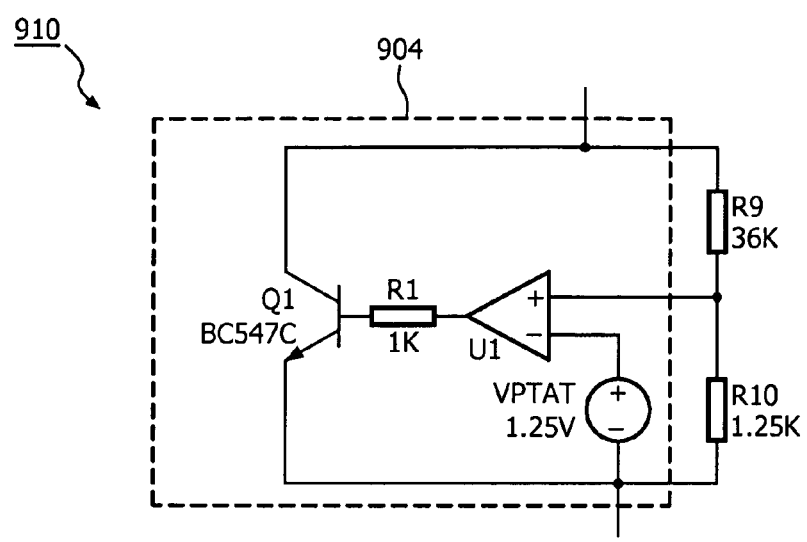

Another embodiment of the power supply system according to the first aspect of the invention is presented in FIG. 9a. The power supply system 900 is similar to the power supply system 700 of FIG. 7. The function and operation of the micro controller 908 is similar to the function and operation of controller 702 of FIG. 7. The micro controller 908 may further be used to control the (primary) operation of the device in which the power supply system 900 is employed. The power supply system 900 comprises an integrated circuit (IC) 902 in which a part of the power supply system 700 is implemented. The zener diodes $D_{3b}$ and $D_{3a}$ are not comprised in the IC 902 because the availability of zener diodes on an IC is limited. Instead of zener diode $D_{3b}$ a shunt regulator 904 with a control loop comprising resistors $R_9$ and $R_{10}$ is implemented on the IC 902. Instead of zener diode $R_{3a}$ a further shunt regulator 906 with a further control loop comprising resistors $R_{11}$ and $R_{12}$ is implemented on the IC 902. The configuration of the shunt regulator 904 inclusive the control loop comprising resistors $R_9$ and $R_{10}$ is presented in FIG. 9b. The shunt regulator 904 comprises a PTAT voltage source for creating a reference voltage which is provided to the minus input of a operational amplifier (opamp) $U_1$. The resistors $R_9$ and $R_{10}$ form a voltage dividing circuit which provides a divided voltage to the plus input of opamp $U_1$. The output of the opamp $U_1$ is provided via a resistor $R_1$ to the basis of a parallel transistor Q1 which is coupled between the two terminals of the shunt regulator 904. If the divided voltage is larger than the reference voltage, the transistor starts to conduct which causes a smaller voltage difference between the two terminals of the shunt regulator. The voltage dividing circuit in combination with the provided voltage of the PTAT voltage source determines to which voltage the voltage is limited by the shunt regulator.

Figure 10:
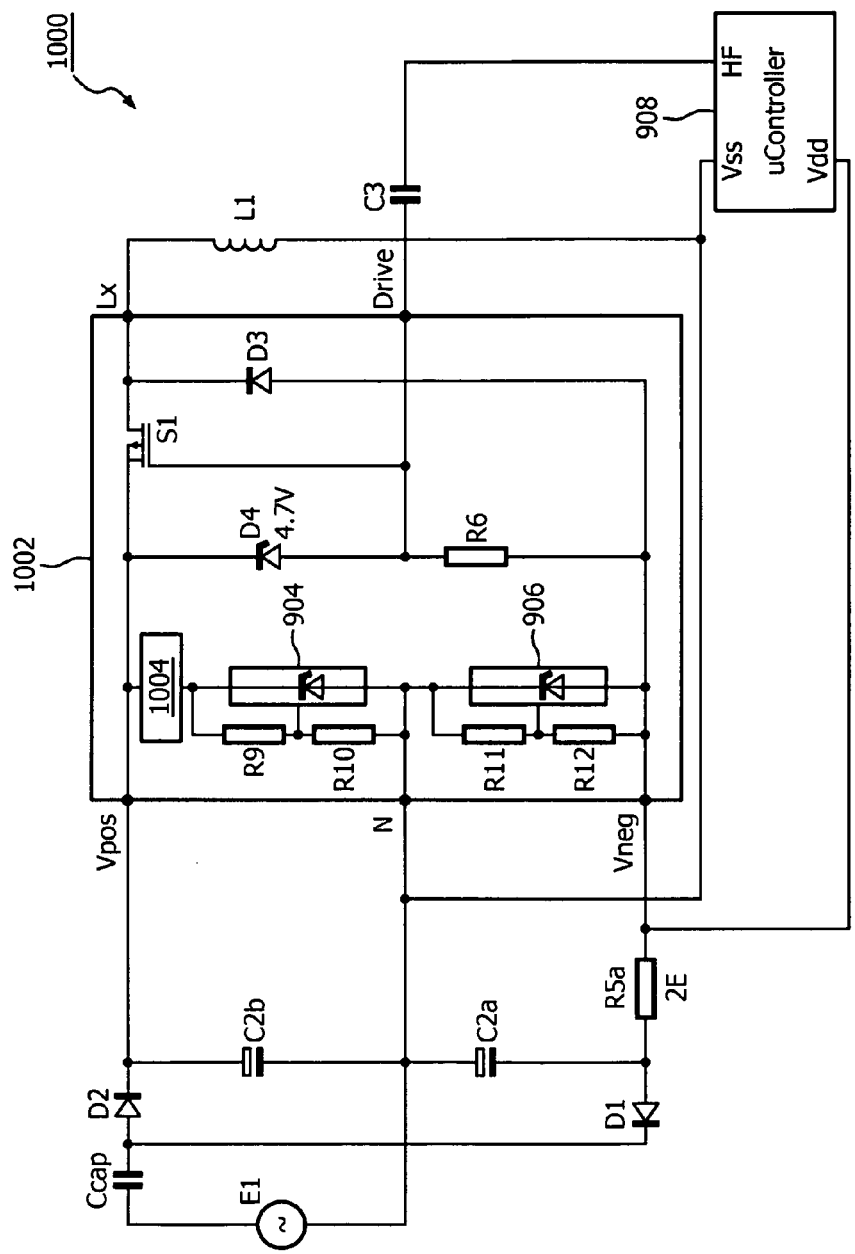

Another embodiment of the power supply system according to the first aspect of the invention is presented in FIG. 10. The power supply system 1000 is similar to power supply system 900 of FIG. 9a, however, the surge resistor R5b is replaced by an active current limiting circuit 1004 which is implemented in the IC 1002 and arranged in series with the shunt regulator 904.

Figure 11:
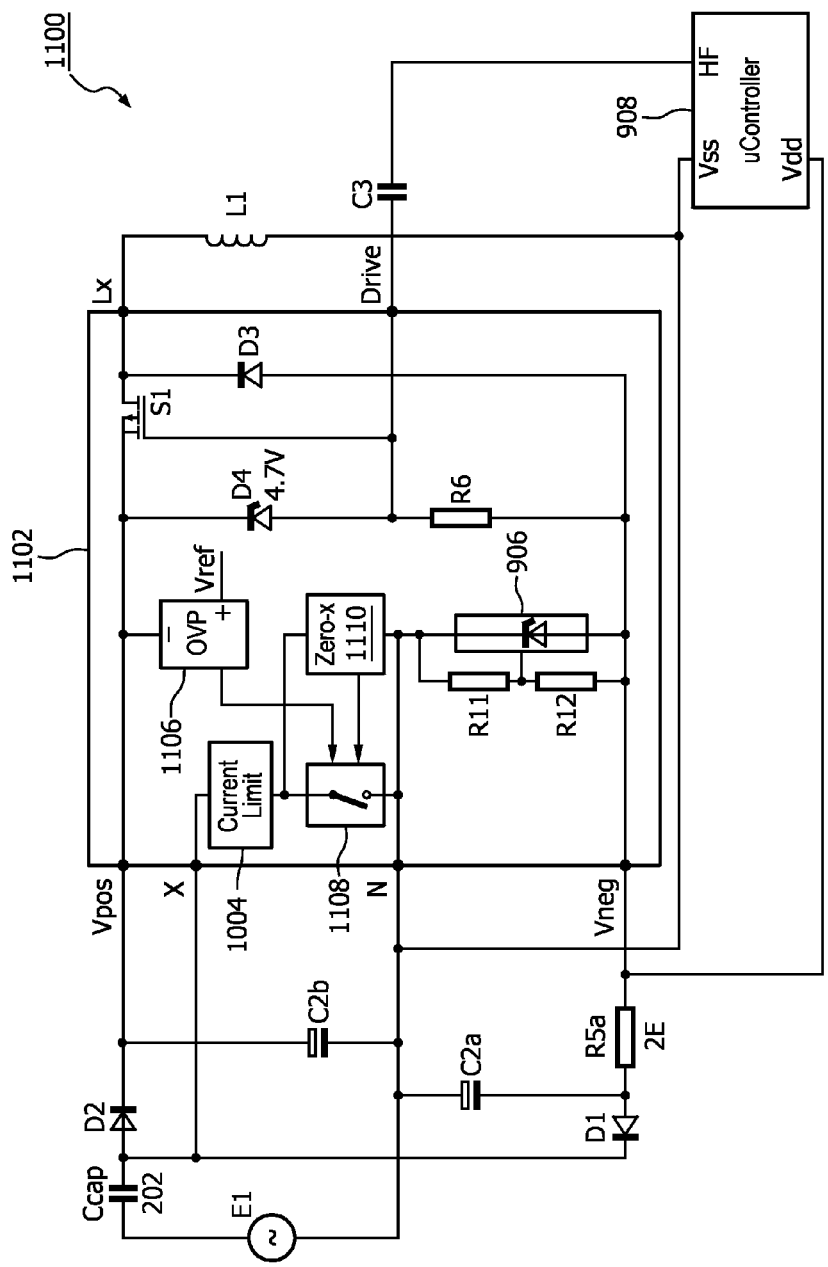
Figure 18:
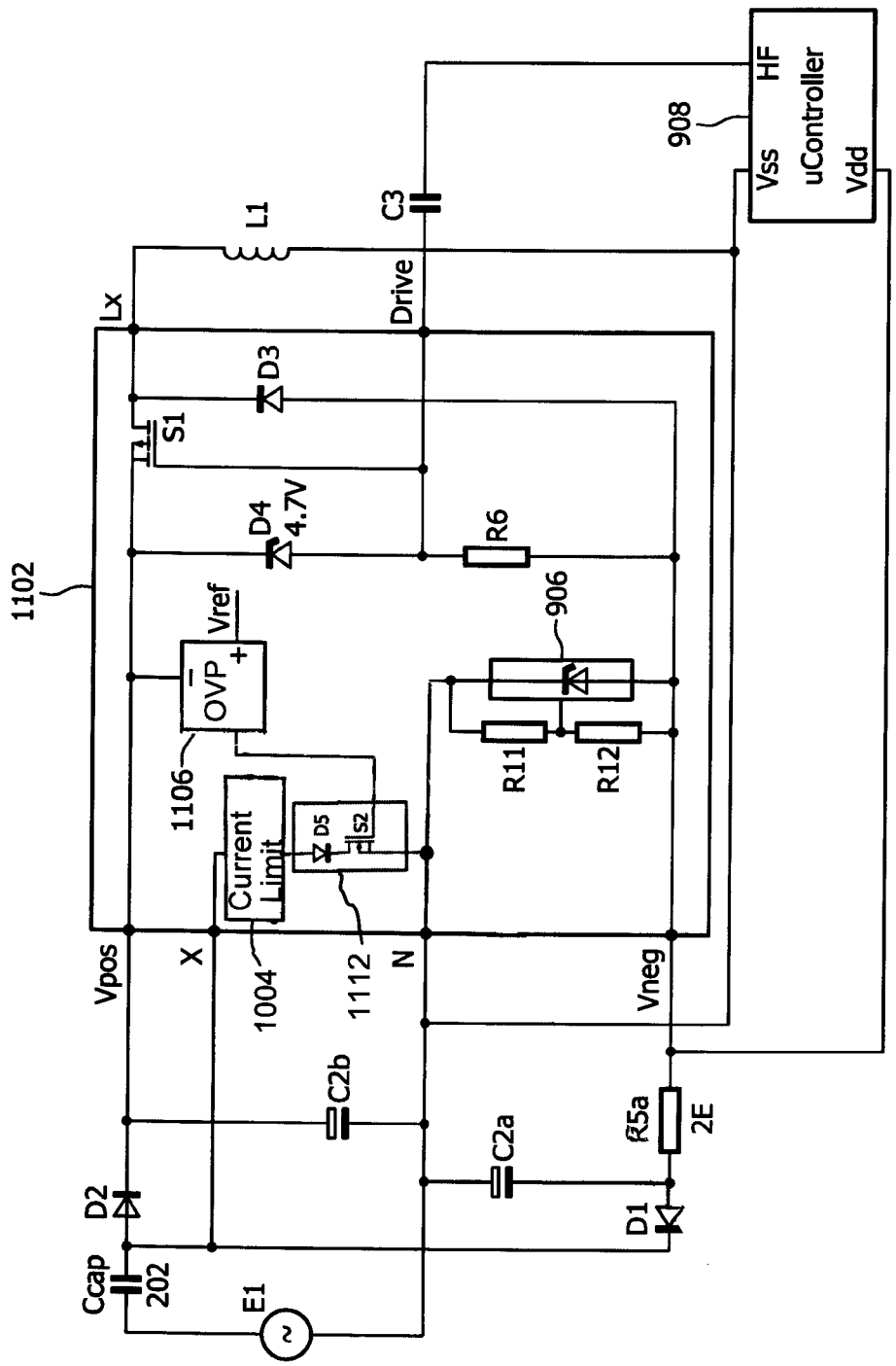
FIG. 18 schematically shows a second embodiment of the power supply system of FIG. 11 in which a bi-directional controllable switch 1108 and a zero-x circuit 1110 of FIG. 11 are replaced by a series arrangement 1112 of an N-MOS transistor $S_2$ and a diode $D_5$.
Figure 19:
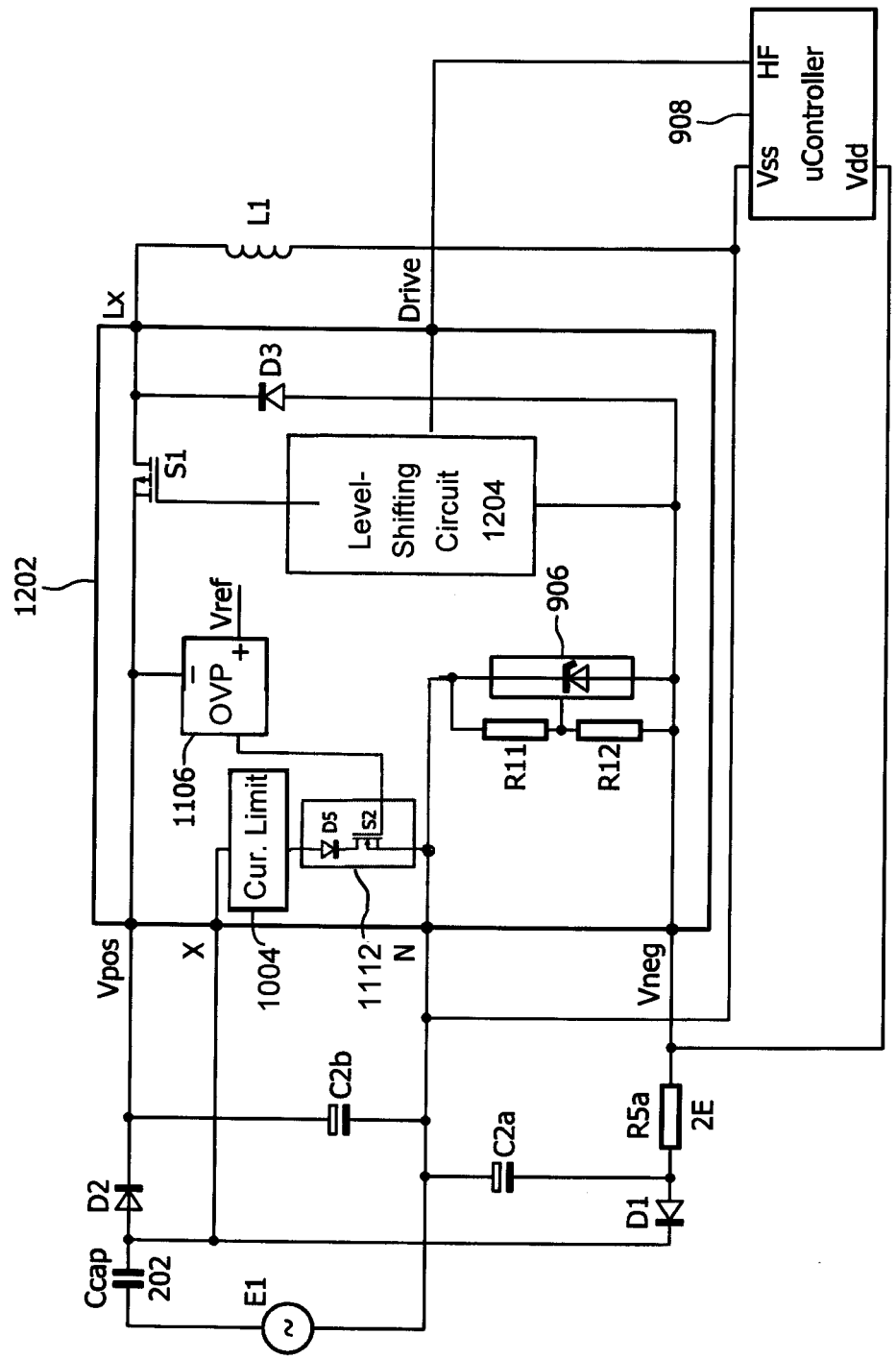
FIG. 19 schematically shows a second embodiment of the power supply system of FIG. 12 in which a bi-directional controllable switch 1108 and a zero-x circuit 1110 of FIG. 12 are replaced by a series arrangement 1112 of an N-MOS transistor $S_2$ and a diode $D_5$.
Figure 20:
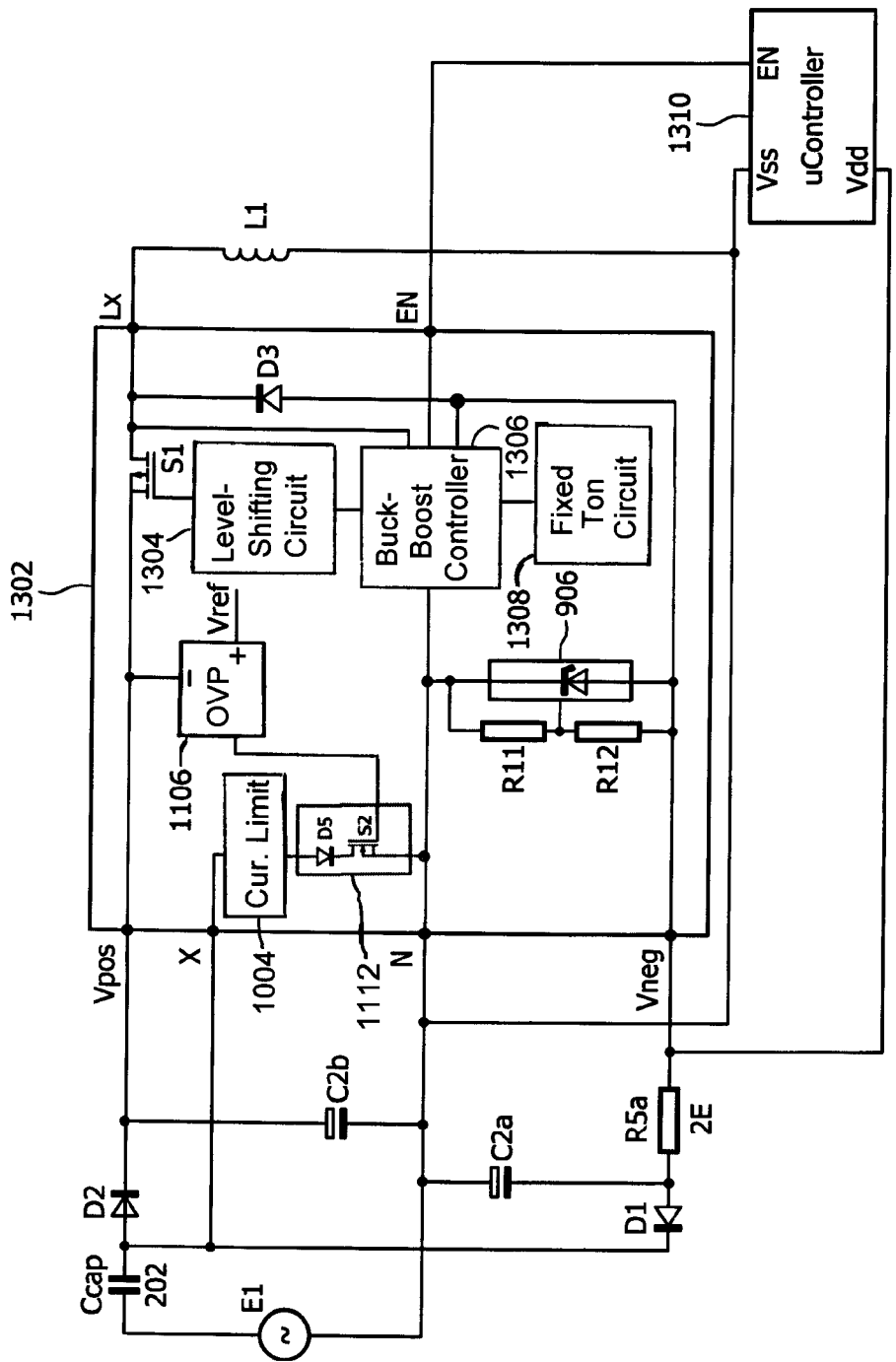
FIG. 20 schematically shows a second embodiment of the power supply system of FIG. 13 in which a bi-directional controllable switch 1108 and a zero-x circuit 1110 of FIG. 13 are replaced by a series arrangement 1112 of an N-MOS transistor $S_2$ and a diode $D_5$.
Figure 21:
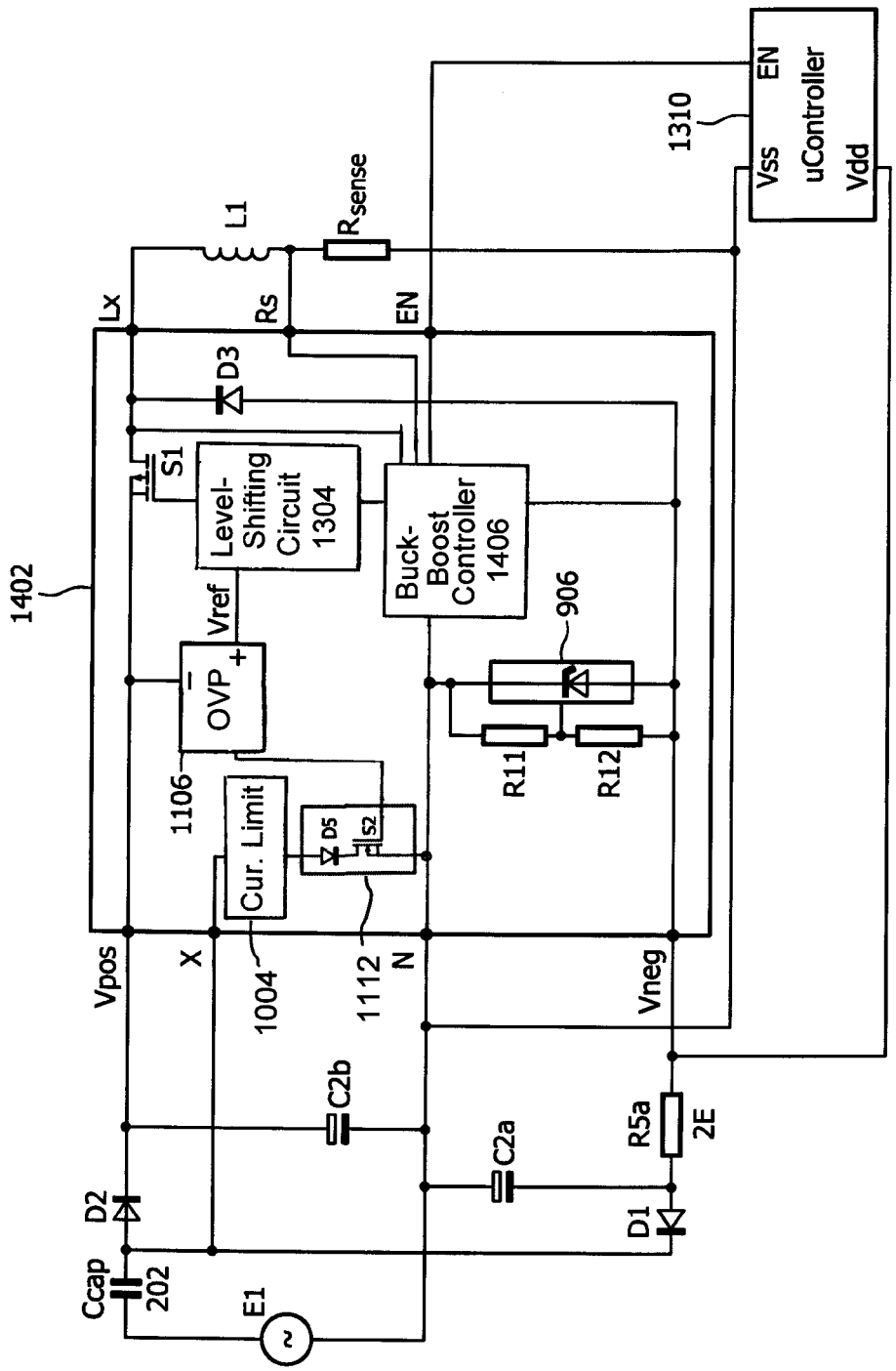
FIG. 21 schematically shows a second embodiment of the power supply system of FIG. 14 in which a bi-directional controllable switch 1108 and a zero-x circuit 1110 of FIG. 14 are replaced by a series arrangement 1112 of an N-MOS transistor $S_2$ and a diode $D_5$.
Figure 22:
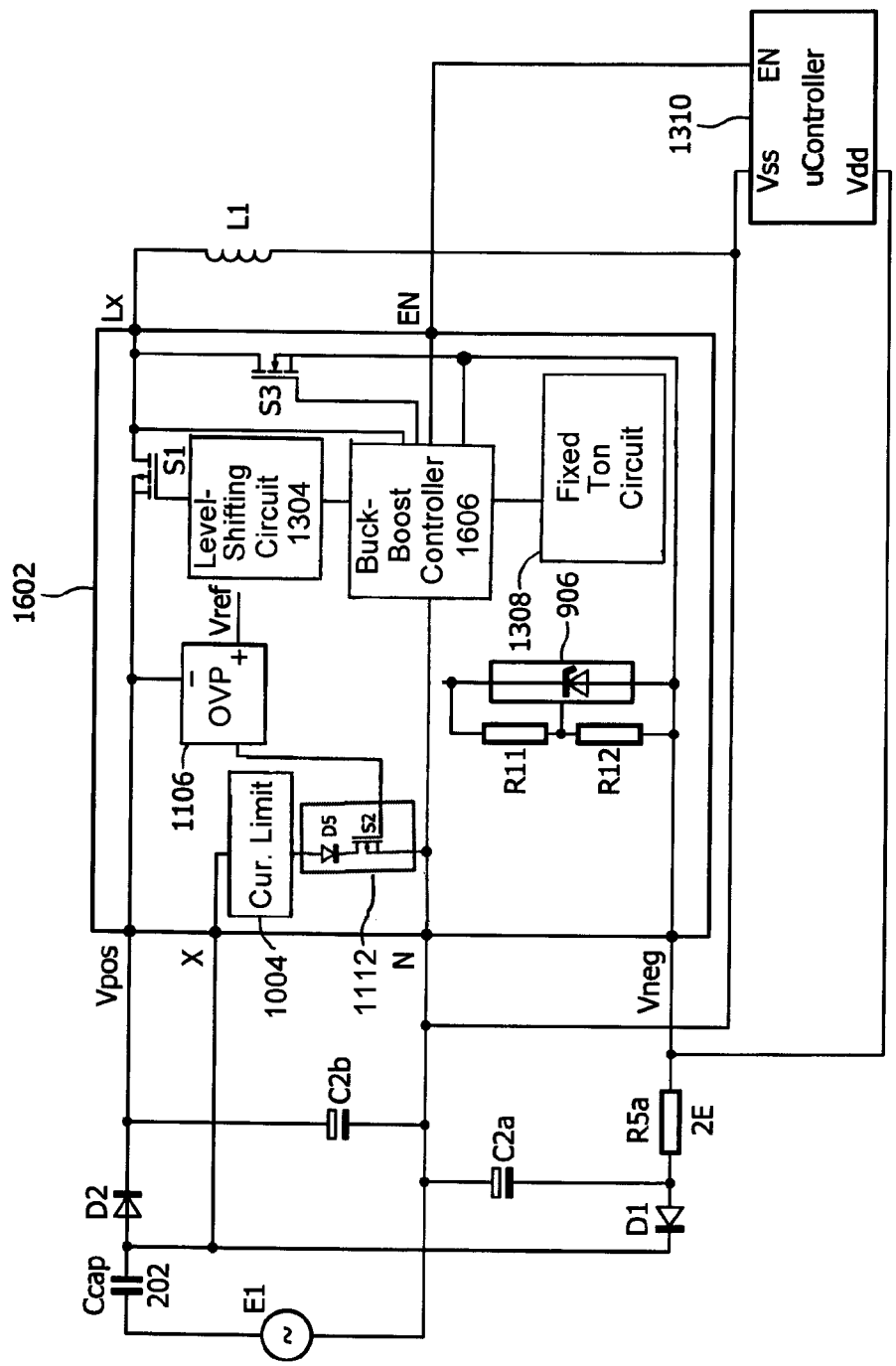
FIG. 22 schematically shows a second embodiment of the power supply system of FIG. 16 in which a bi-directional controllable switch 1108 and a zero-x circuit 1110 of FIG. 16 are replaced by a series arrangement 1112 of an N-MOS transistor $S_2$ and a diode $D_5$.
Figure 23:
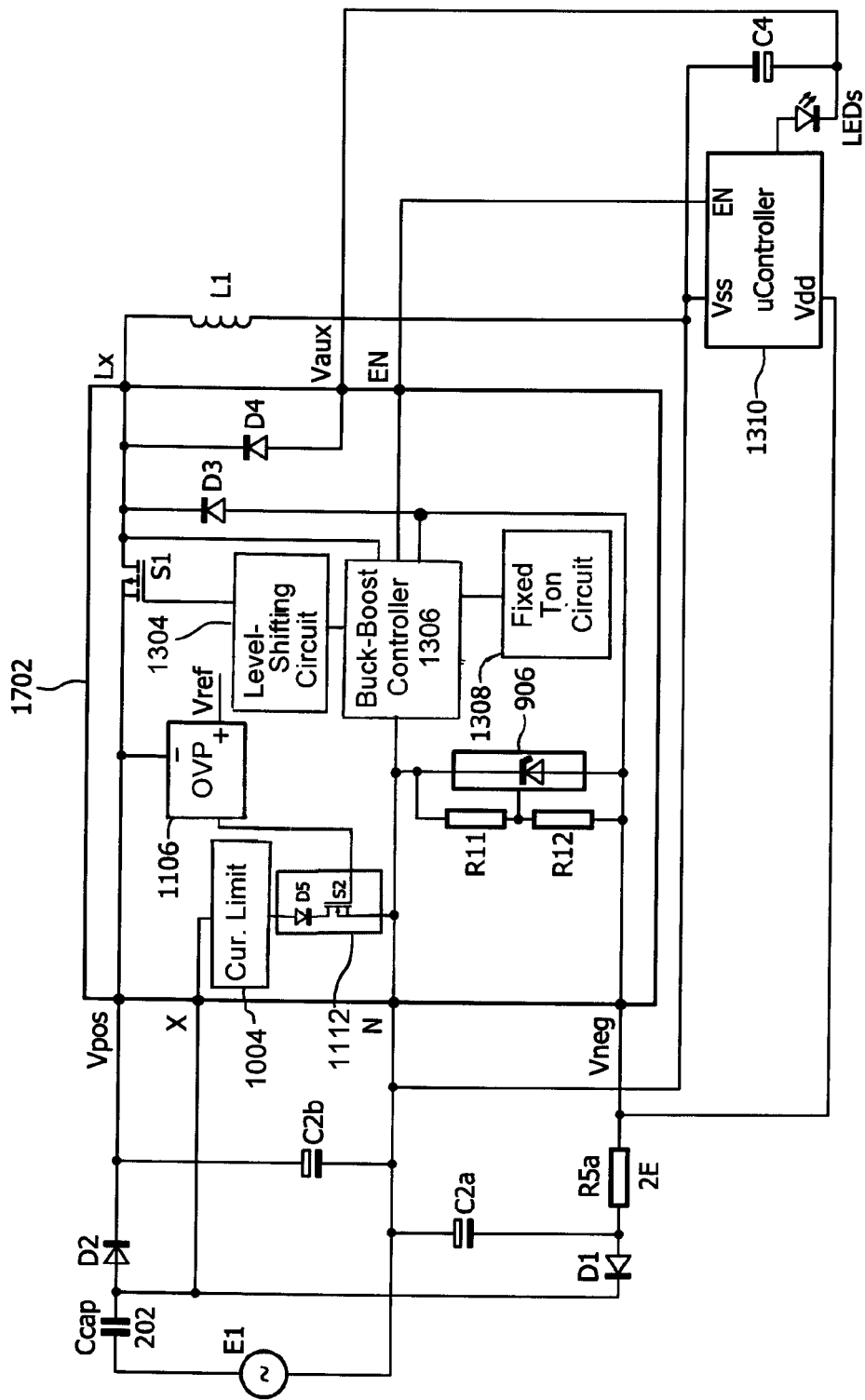
FIG. 23 schematically shows a second embodiment of the power supply system of FIG. 17 in which a bi-directional controllable switch 1108 and a zero-x circuit 1110 of FIG. 17 are replaced by a series arrangement 1112 of an N-MOS transistor $S_2$ and a diode $D_5$.

A further embodiment of the power supply system according to the first aspect of the invention is presented in FIG. 11. The shown embodiment is similar to the power supply system 900 of FIG. 9a and comprises a controllable switch 1108 which is similar to the controllable switch 301 of FIG. 3. The IC 1102 does not comprise the shunt regulator 904 with a control loop as discussed in the context of the power supply system 900 of FIG. 9a. However, the IC 1102 comprises the controllable switch 1108 and a control loop comprising an over voltage protection (OVP) 1106 to control the voltage across capacitor $C_{2b}$. Further, a current limiting circuit, as discussed in the context of FIG. 10, is arranged in series with the controllable switch 1108. The IC 1102 comprises the OVP 1106 which compares the voltage across the capacitor $C_{2b}$ with a reference voltage $V_{ref}$. In a practical embodiment the OVP 1106 is a comparator with hysteresis. The output of the OVP 1106 is provided to the controllable switch in order to close the switch when the voltage across the capacitor $C_{2b}$ is too high. As discussed previously, a reference voltage $V_{ref}$ may be generated with an IC implementation of a PTAT voltage source. When the controllable switch 1108 is a bi-directional switch, a so-termed zero-x circuit 1110 is required to control when the controllable switch 1108 may be closed for a period of time such that the capacitor $C_{2b}$ is not charged any further. The controllable switch 1108 may only be closed when the input AC current is positive, which means that the AC input voltage is increasing. The zero-x circuit 1110 has to measure the AC current and comprises a differentiator network which is relatively complex. Instead of a bi-directional controllable switch 1108 and the zero-x circuit 1110 a series arrangement 1112 of an N-MOS transistor $S_2$ and a diode $D_5$ may be used as shown in FIG. 18.

Figure 12:
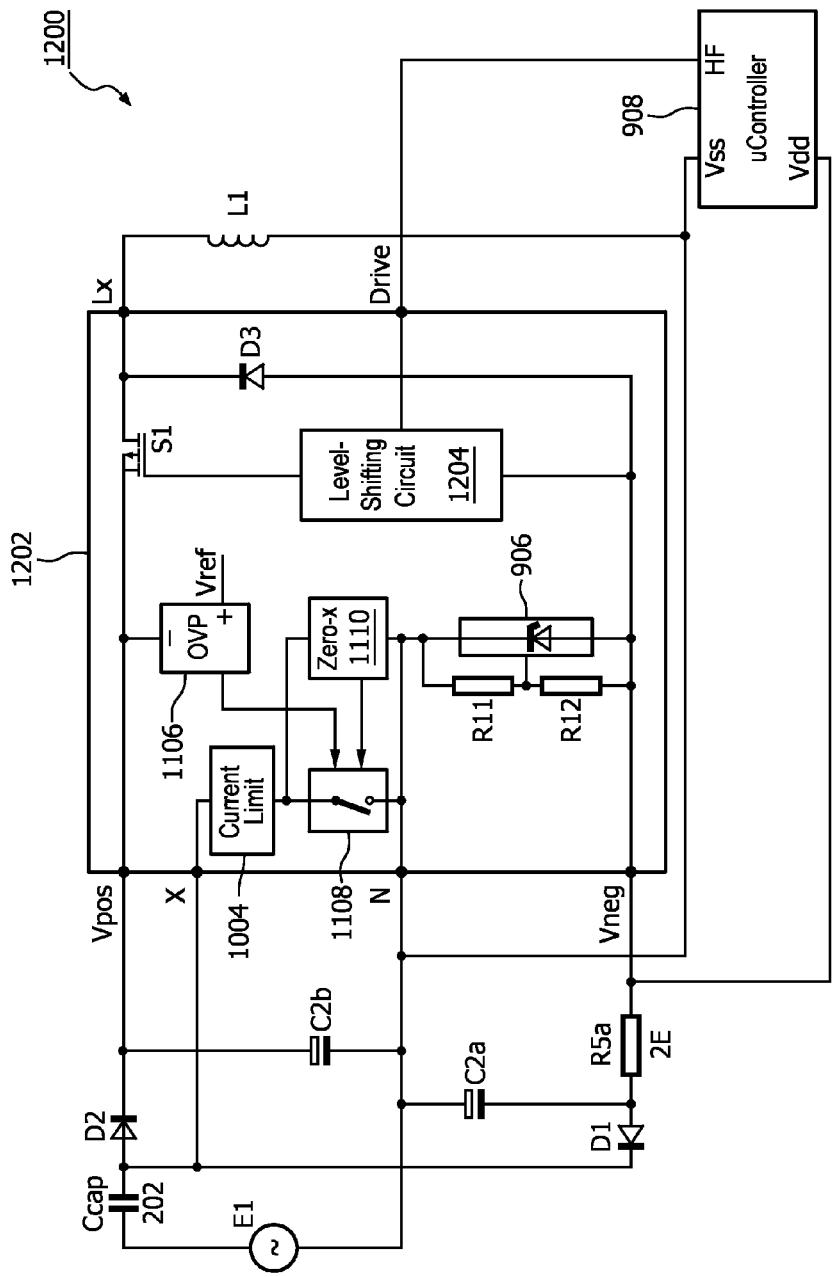

FIG. 12 shows another embodiment of a power supply system 1200. The power supply system 1200 is similar to the power supply system 1100 of FIG. 11. The power supply system 1200 comprises an IC 1202 which comprises, instead of the combination of diode $D_4$, resistor $R_6$ and capacitor $C_3$ of FIG. 11, a level shifting circuit 1204 which transforms a voltage in the voltage domain which power the micro controller 908 to the voltage domain in which controllable switch $S_1$ operates. IC implementations of level shifting circuits are well known in the art. Although a relatively large amount of components have to be used on the IC 1202 to implement the level shifting circuit 1204, this may still be done relatively efficiently compared to the use of an additional external capacitor $C_3$.

Figure 13:
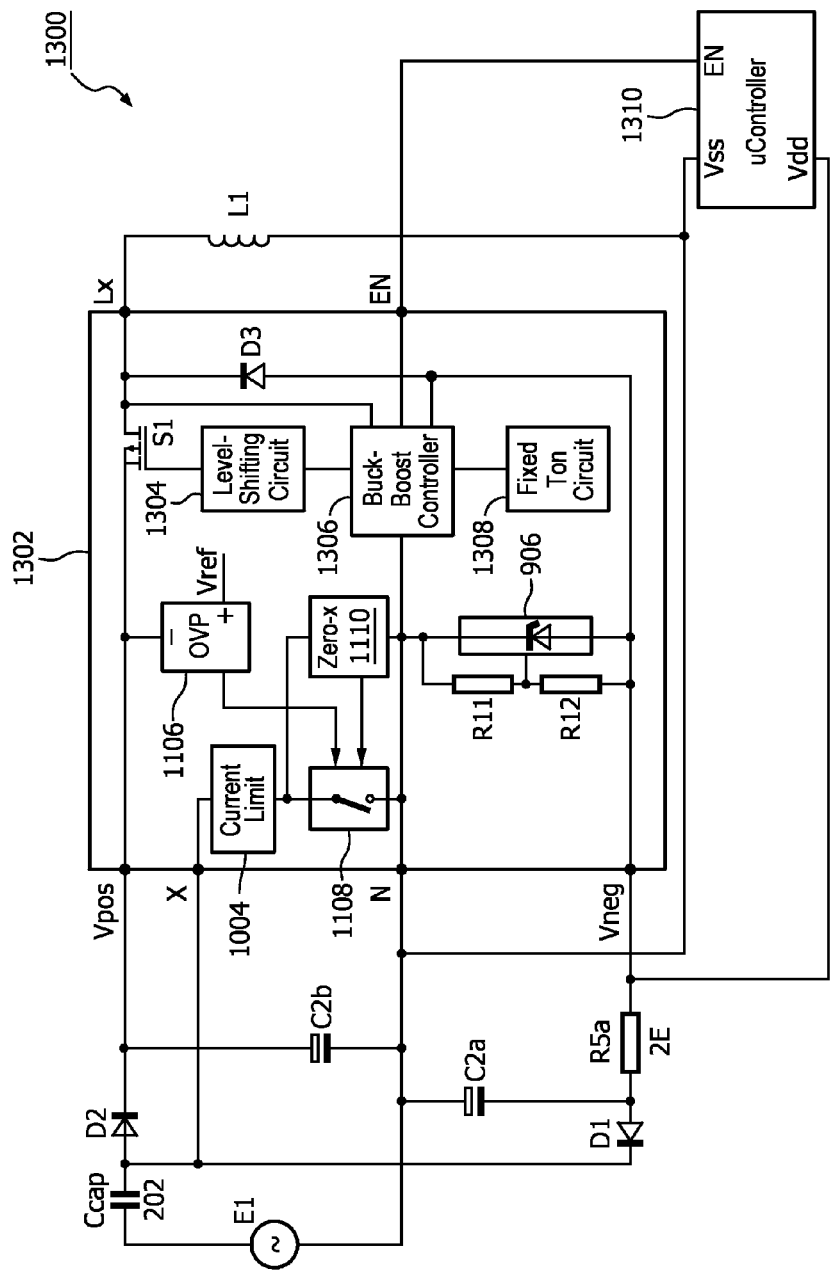

In the previously discussed embodiment, the micro controller 908 controls when the controllable switch S1 of the buck-boost converter is closed. In order to perform this function, the micro controller 908 has to have a timer, which is often not available in relatively cheap micro controllers. The use of a self-oscillating buck-boost converter is a solution for not requiring a timer in the micro controller 908. This is shown in FIG. 13.

A power supply system 1300 comprises an integrated circuit 1302 which is similar to the IC 1202 of FIG. 12. The power supply system 1300 further comprises a micro controller 1310 which is comparable to the micro controller 908 of previous embodiments, however, the enabling signal EN of the micro controller 908 which is provided to the integrated circuit 1302 only indicates whether the DC-DC converter has to operate. In the power supply system 1300 the DC-DC converter is a buck-boost converter formed by a controllable switch $S_1$, a diode $D_3$, an inductor $L_1$ and a buck-boost controller 1306. In the embodiment the buck-boost controller 1306 is a so-termed PWM SOPS controller, which means, a Pulse Width Modulation Self-Oscillating Power Supply controller. Such controllers are known in the art. The buck-boost controller 1306 generates a control signal which is used to control the conducting and non-conducting state of the controllable switch $S_1$. The control signal is provided to a level shifting circuit 1304 to generate the correct voltage level that is required to drive the controllable switch $S_1$. The buck-boost controller 1306 is powered by the neutral supply voltage N and the negative supply voltage $V_{neg}$. The buck-boost controller 1306 further receives the enabling signal EN from the micro controller 1310 which indicates whether the buck-boost converter has to operate. Basically different solutions are possible to operate the self-oscillating buck-boost converter. In FIG. 13 the buck-boost controller 1306 is connected to a so-termed fixed ton circuit 1308 and has a connection with the node shared between the controllable switch $S_1$, the inductor $L_1$ and diode $D_3$. The to the shared node is used to monitor the current through diode $D_3$. The fixed ton circuit 1308 and the buck-boost controller 1306 provide a so-termed fixed ton control of the buck-boost converter. This means that the controllable switch $S_1$ is controlled in a conducting state for a fixed period of time. After controlling the controllable switch $S_1$ in a non-conducting state and when the current through diode $D_3$ is substantially equal to zero, the controllable switch $S_1$ is controlled in the conducting state for the fixed period of time. An advantage of a fixed ton control of a buck-boost converter is that the frequency at which the buck-boost converter is operated is substantially constant. A disadvantage is that the maximum power of the buck-boost converter depends on the spread of the value of $L_1$. Further, if $V_{pos}$ becomes, for example, temporarily lower than the voltage level at which the controllable switch 1108 and the over voltage protection 1106 try to regulate $V_{pos}$, the input current decreases, and the maximum power of the buck-boost converter decreases as well. This may be prevented with the controlling mechanism which is discussed together with FIG. 14.

Figure 14:
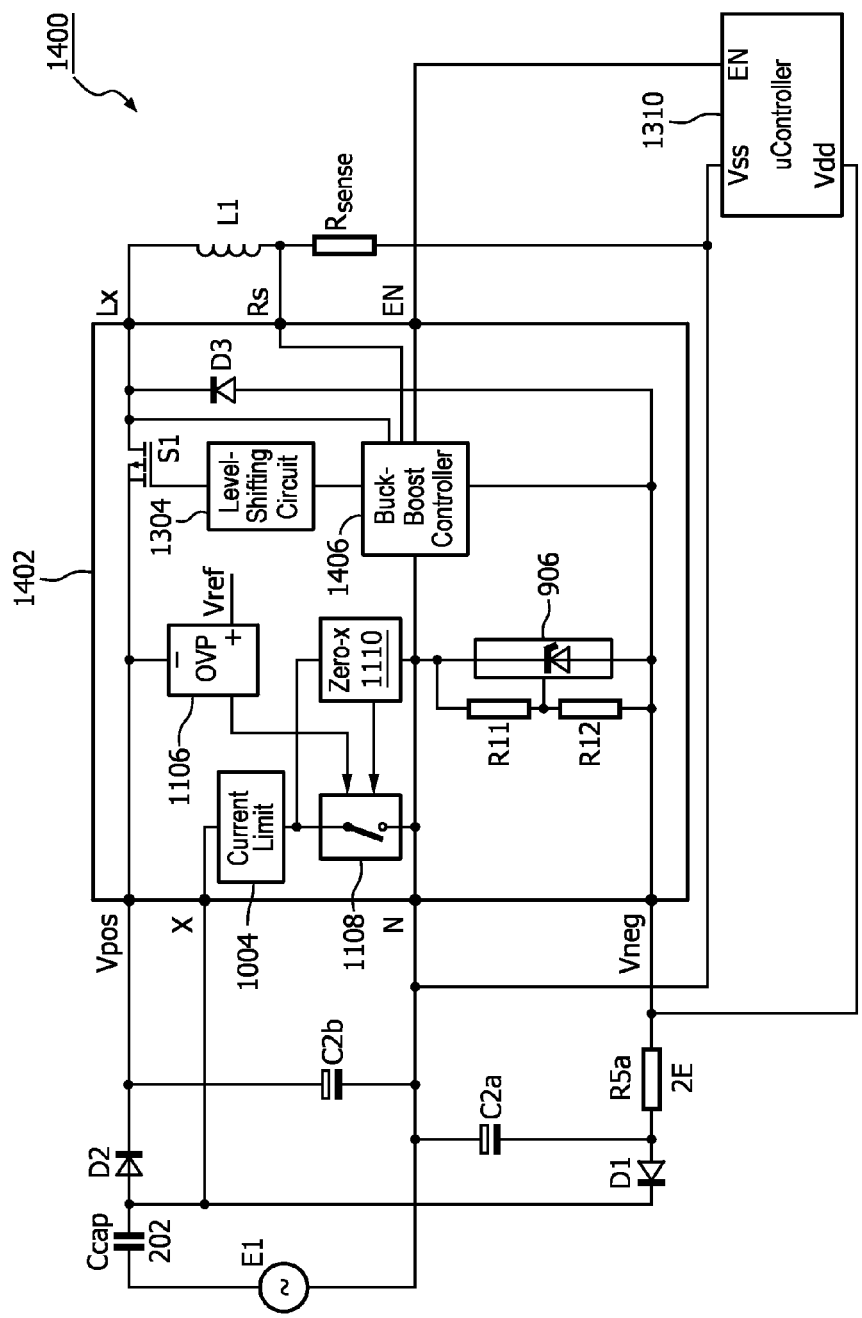

FIG. 14 presents an embodiment of a power supply system 1400. A resistor $R_{sense}$ is arranged in series with the inductor $L_1$ to measure the current through the inductor $L_1$. The voltage of the node shared by the resistor $R_{sense}$ and the inductor $L_1$, is provided to an IC 1402 which is similar to IC 1302 of FIG. 13, however, IC 1402 comprises buck-boost controller 1406 which does not control the controllable switch $S_1$ on basis of a fixed ton controlling mechanism, but on basis of measuring the amount of energy that is stored in the inductor $L_1$. When controllable switch $S_1$ is controlled in the conducting state, the current through $L_1$ increases and the buck-boost controller senses the value of the current via input port $R_s$ of the integrated circuit 1402. When a maximum current $I_{peak}$ through $L_1$ has been reached, determined by the value of resistor $R_{sense}$, the controllable switch $S_1$ is controlled in the non-conducting state until the current through diode $D_3$ becomes substantially equal to zero. When the current through diode $D_3$ is substantially equal to zero, the controllable switch is controlled in the conducting state. An advantage of this controlling mechanism is that the spread of the value of inductor $L_1$ may be neutralized. A disadvantage is that, when the maximum current $I_{peak}$ becomes too high, more power is requested than that can be delivered via the positive power supply and as such the voltage level $V_{pos}$ decreases.

Figure 15:
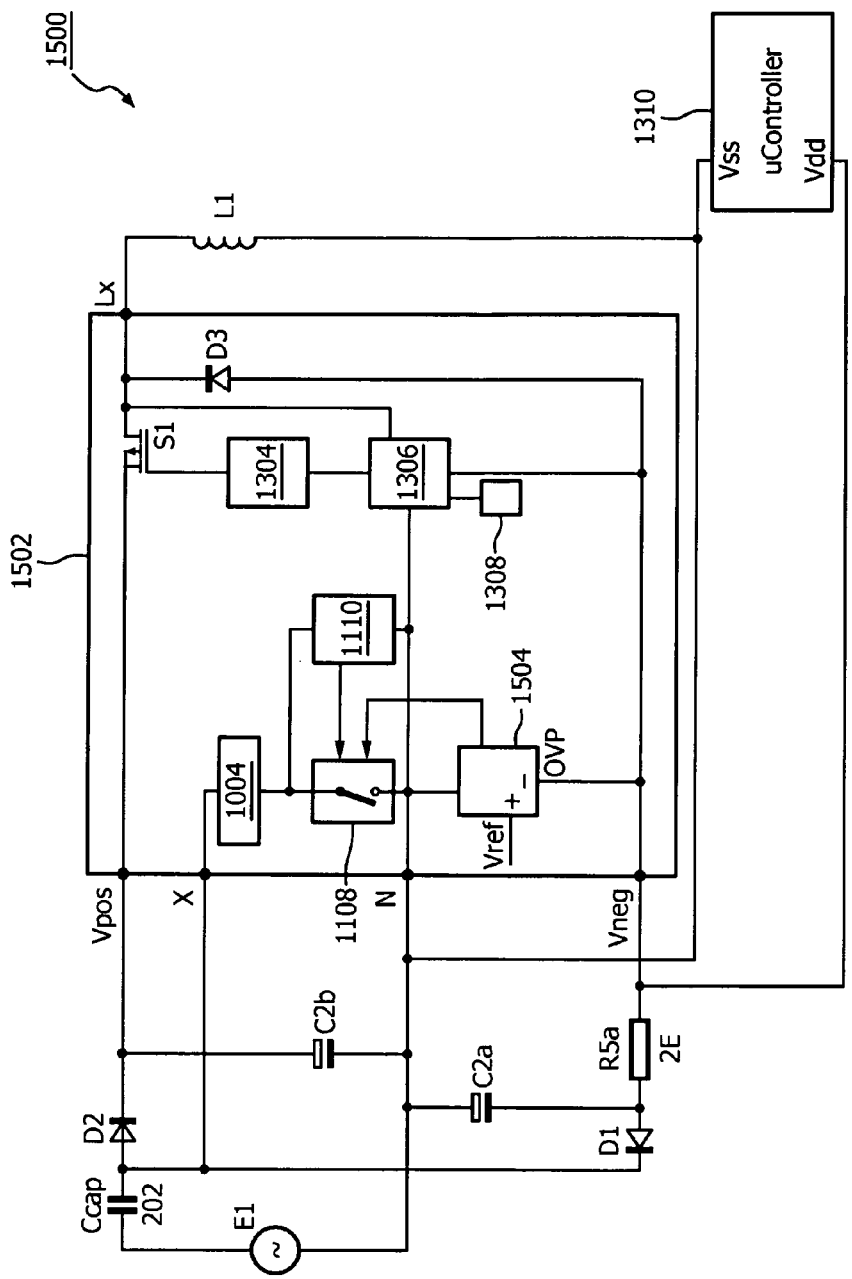

FIG. 15 presents another embodiment of a power supply system. The power supply system 1500 is similar to the power supply system 1300 of FIG. 13, and comprises, for example, for the buck-boost converter control a fixed ton controlling mechanism by means of the buck-boost controller 1306 and the fixed ton circuit 1308. In an IC 1502 of FIG. 15, the negative voltage level $V_{neg}$ is controlled by proportionally controlling the positive voltage level $V_{pos}$. The voltage across capacitor $C_{2b}$ is not longer kept constant, but the voltage across capacitor $C_{2b}$ controlled in dependence of the power consumption of the load that is powered by the negative voltage $V_{neg}$. Via the over voltage protection (OVP) 1504 the negative voltage is compared to a reference voltage $V_{ref}$. In a practical embodiment, the OVP 1504 is a comparator with hysteresis. If the absolute value of the negative voltage level $V_{neg}$ is too low, the controllable switch 1108 is controlled to allow an increase of the voltage across capacitor $C_{2b}$, and if the absolute value of the negative voltage level $V_{neg}$ is too high, the controllable switch 1108 is controlled to allow a decrease of the voltage across capacitor $C_{2b}$. The result of the controlling is that exactly the correct amount of power is provided to the buck-boost converter. This type of controlling, being the controlling of the positive voltage level $V_{pos}$ in dependence of the negative voltage level $V_{neg}$, cooperates well with the fixed ton controlling of the buck-boost converter. Further, in an embodiment, the microcontroller 1310 does not have the enabling output signal EN, and thus, the IC 1502 does not have an input pin to receive the enabling signal EN: if the amount of consumed power is low, controllable switch 1108 is continuously closed, and, as discussed in previous embodiment (for example, in the context of FIG. 3), the standby losses are kept low by keeping the voltage across capacitor $C_{2b}$ substantially equal to zero and thereby regulating the buck-boost converter in a non-operating state.

It is to be noted that, the controllable switch 1108 has to be a bi-directional switch. The controlling of the negative voltage level $V_{neg}$ with the circuit of FIG. 15 only performs well when the current through the controllable switch may be negative or positive. The controllable switch 1108 may not be replaced by the series arrangement 1112 of FIG. 11. Further, the controllable switch S1 is drawn as a P-MOS transistor. The controllable switch $S_1$ may also be implemented as an PNP, NPN or N-MOS transistor. However, it is advantageous to use a P-MOS transistor in power supply systems as system 1500 because the amount of converted power is relatively low.

Figure 16:
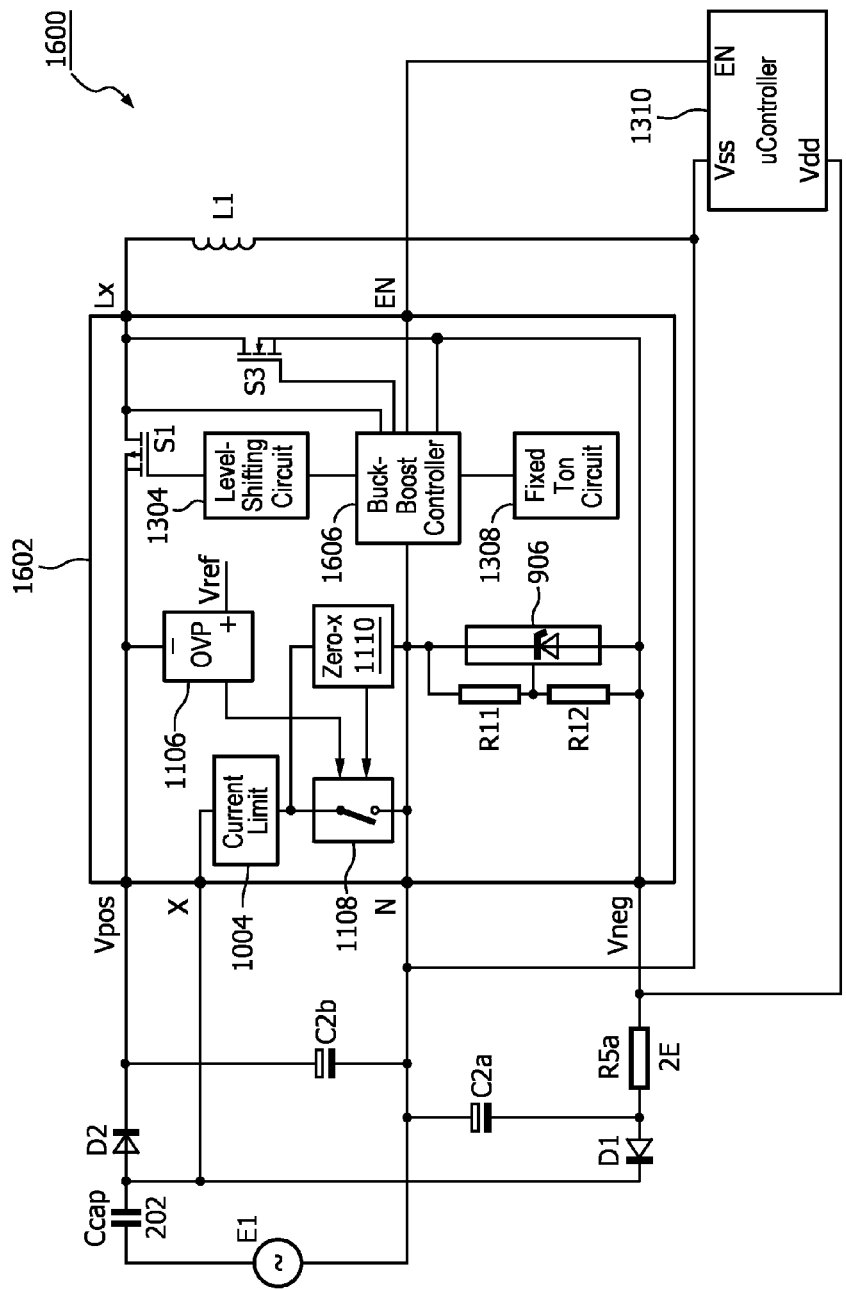

In FIG. 16, a further embodiment of a power supply system according to the first aspect of the invention is provided. Power supply system 1600 comprises an integrated circuit (IC) 1602 which is similar to the IC 1302 of FIG. 13, however, the diode $D_3$ is replaced by a controllable switch $S_3$, which is drawn in FIG. 16 as an NMOS transistor. The buck-boost controller 1606 controls the controllable switch $S_3$ to obtain a synchronous rectifier functionality with the controllable switch $S_3$. A replacement of the diode $D_3$ by an NMOS transistor and a controlling circuit for the NMOS transistor can easily be obtained in an IC implementation, but not when the buck-boost converter is implemented in separate components.

Figure 17:
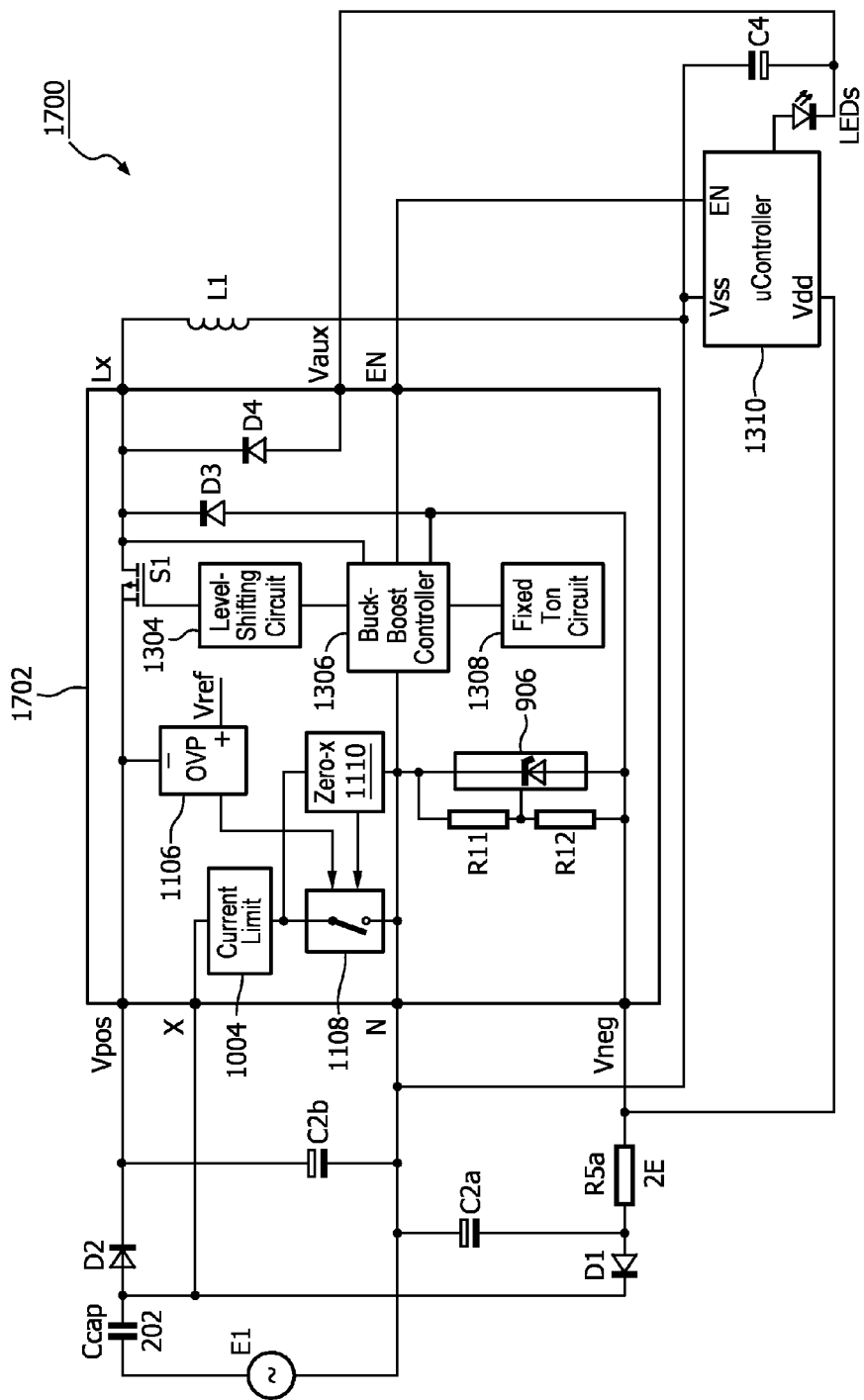

In FIG. 17 presents another embodiment of a power supply system. The power supply system 1700 comprises an integrated circuit (IC) 1702 which is similar to the IC 1302 of the embodiment of FIG. 13. In addition to diode $D_3$ a diode $D_4$ is used to provide power to an additional power rail $V_{aux}$. The power rail $V_{aux}$ has an capacitor C4 to temporarily store energy, and the power rail $V_{aux}$ is used to provide power to, for example, all LEDs of the device in which the power supply system is used. An advantage of the configuration with an additional power rail $V_{aux}$ is that, when, despite safety measures, the power rail $V_{aux}$ is short-circuited, the power supply system 1700 still provides power to the micro controller 1310 via the negative voltage rail $V_{neg}$. Thus, the operation of the micro controller 1310 is not interrupted by problems in circuits which are powered via the $V_{aux}$ power rail.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:
1. A power supply system (200, 300, 400, 600, 700, 812, 900, 1000, 1100, 1200, 1300, 1400, 1500, 1600, 1700) comprising:
 a first input (206) for receiving an AC voltage,
 an output (218) for supplying power to a load (216, RL),
 a DC-DC converter (204, 404) comprising a second input (203) being capacitively coupled to the first input (206), and being arranged for supplying power to the output (218),
 a rectifying circuit (212, D1) being capacitively coupled to the first input (206) and being arranged between the first input (206) and the output (218) for supplying a rectified output voltage to the output (218), and a voltage limiter (214, Dzener2, D3*a*) being coupled to the output (218) for limiting the rectified output voltage to a predefined voltage.

2. A power supply system (200, 300, 400, 600, 700, 812) according to claim 1 comprising:
   a further rectifying circuit (302, D2) capacitively coupled to the first input (206) for providing a further rectified voltage to the second input (203), and
   a further voltage limiter (304, Dzener1, D3*b*) coupled to the second input (203) and arranged for limiting the further rectified voltage of the second input (203) to a further predefined voltage.

3. A power supply system (200, 300, 400, 600, 700, 812) according to claim 2, wherein the absolute value of the further predefined voltage is larger than the absolute value of the predefined voltage.

4. A power supply system (200, 300, 400, 600, 700, 812) according to claim 2 being configured for operating either in a standby mode to provide standby power to the load (216, RL) or in an operational mode to provide operational power to the load (216, RL), the power supply system (200, 300, 400, 600, 700, 812) comprises a short-circuiting controllable switch (306) arranged in parallel to the further voltage limiter (304, Dzener1, D3*b*) for short-circuiting the further voltage limiter (304, Dzener1, D3*b*), and a controller (406, 602, 702, 814) for closing the short-circuiting controllable switch (306) in the standby mode, or the power supply system (200, 300, 400, 600, 700, 812, 900, 1000, 1100, 1200, 1300, 1400, 1500, 1600, 1700) comprises a further short-circuiting controllable switch (301) arranged between a node shared by a capacitive coupling (208, Ccap) and the further rectifying circuit (302, D2) and a node of the power supply system (200, 300, 400, 600, 700, 812, 900, 1000, 1100, 1200, 1300, 1400, 1500, 1600, 1700) having a neutral voltage (N), and comprises the controller (406, 602, 702, 814) for closing the further short-circuiting controllable switch (301) in the standby mode.

5. A power supply system (200, 300, 400, 600, 700, 812) according to claim 2 being configured for operating either in a standby mode to provide standby power to the load (216, RL) or in an operational mode to provide operational power to the load (216, RL),
   wherein the DC-DC converter (204, 404) comprises a buck-boost converter comprising a controllable switch (S1, M1) for modulating a current through an inductance (L1),
   wherein the power supply system (200, 300, 400, 600, 700, 812) comprises a controller (406, 602, 702, 814) for controlling the controllable switch (S1, M1),
   wherein the controller (406, 602, 702, 814) is arranged for (i) controlling the controllable switch (S1, M1) to be permanently in a closed state in the standby mode of the power supply system for short-circuiting the further voltage limiter (304, Dzener1, D3*b*) via the inductance (L1), and (ii) controlling the controllable switch (S1, M1) to alternate between an open state and the closed state in the operational mode of the power supply system (200, 300, 400, 600, 700, 812) for controlling the storage and release of energy in and by the inductance (L1).

6. A power supply system (200, 300, 400, 600, 700, 812) according to claim 2, wherein the power supply system (200, 300, 400, 600, 700, 812) comprises a first capacitive coupling (202) being coupled between the first input (206) and the rectifying circuit (212, D1), and comprises a second capacitive coupling (210) being coupled between the first input (206) and the further rectifying circuit (302, D2), wherein the first capacitive coupling (202) and the second capacitive coupling (210) each comprises a capacitor for providing the capacitive coupling.

7. A power supply system (200, 300, 400, 600, 700, 812) according to claim 2, wherein the AC voltage received by the first input (206) comprises an increasing-voltage part of the AC voltage wave and comprises a decreasing-voltage part of the AC voltage wave, wherein the rectifying circuit (212, D1) is arranged to rectify only one of the increasing-voltage part or the decreasing-voltage part, and the further rectifying circuit (302, D2) is arranged to rectify the another one of the increasing-voltage part or decreasing-voltage part.

8. An electronic device (800) comprising
   a device controller (406, 602, 702, 814) for controlling an operation of the electronic device (800) to control the electronic device (800) to be in a standby mode or in an operational mode,
   a power supply system (200, 300, 400, 600, 700, 812) according to claim 7, wherein the controller (406, 602, 702, 814) of the power supply system (200, 300, 400, 600, 700, 812) is integrated with the device controller (406, 602, 702, 814).

9. A controller (406, 602, 702, 814) for use in the power supply system (200, 300, 400, 600, 700, 812) according to claim 7.

10. A power supply system (200, 300, 400, 600, 700, 812) according to claim 2, wherein the power supply system (200, 300, 400, 600, 700, 812) comprises a single capacitive coupling (208, Ccap) being coupled between the first input (206) and the rectifying circuit (212, D1) and being coupled between the first input (206) and the further rectifying circuit (302, D2), wherein the single capacitive coupling (208, Ccap) comprises a capacitor for providing the capacitive coupling.

11. A power supply system (200, 300, 400, 600, 700, 812, 900, 1000, 1100, 1200, 1300, 1400, 1500, 1600, 1700) according to claim 1, wherein the power supply system (200, 300, 400, 600, 700, 812, 900, 1000, 1100, 1200, 1300, 1400, 1500, 1600, 1700) comprises an integrated circuit (902, 1002, 1102, 1202, 1302, 1402, 1502, 1602, 1702) which comprises at least one of the group of: at least a part of the DC-DC converter (204, 404), the voltage limiter (214, Dzener2, D3*a*), the further voltage limiter (304, Dzener1, D3*b*), the short-circuiting controllable switch (306), the controller (406, 602, 702, 814) for controlling the short-circuiting controllable switch (306), at least a part of the buck-boost converter, the controllable switch (M1, S1) of the buck-boost converter, a diode (D3) of the buck-boost converter, a further diode (D4) of the buck-boost converter for providing power to a further power rail ($V_{aux}$), the controller (702, 1204, 1306, 1406) for controlling the controllable switch (M1, S1) of the buck-boost converter, a current limiting circuit (1004) for limiting the current through the voltage limiter (214, Dzener2, D3*a*).

12. A power supply system (200, 300, 400, 600, 700, 812, 900, 1000, 1100, 1200, 1300, 1400, 1500, 1600, 1700) according to claim 11, wherein
   the voltage limiter (214, Dzener2, D3*a*) comprises a shunt regulator (904, 910) with a control loop formed by a series arrangement of two resistors (R9, R10), or
   the further voltage limiter (304, Dzener1, D3*b*) comprises a further shunt regulator (906) with a control loop formed by a further series arrangement of two resistors (R11, R12), or
   the voltage limiter (214, Dzener2, D3*a*) comprises a shunt regulator (904, 910) with a control loop formed by a series arrangement of two resistors (R9, R10) and the further voltage limiter (304, Dzener1, D3*b*) comprises a further shunt regulator (906) with a control loop formed by a further series arrangement of two resistors (R11, R12).

13. An electronic device (800) comprising a power supply system (200, 300, 400, 600, 700, 812) according to claim 1.

14. A power supply system (200, 300, 400, 600, 700, 812) according to claim 1 being configured for operating either in a standby mode to provide standby power to the load (216, RL) or in an operational mode to provide operational power to the load (216, RL), and comprising a controller for controlling a disconnection controllable switch (307) to disconnect the second input of the DC-DC converter from the capacitive coupling to the input in the standby mode.

15. A power supply system (200, 300, 400, 600, 700, 812) according to claim 1, wherein
the power supply system (200, 300, 400, 600, 700, 812) comprises a single capacitive coupling (208, Ccap) comprising at least one capacitor.

16. A power supply system (200, 300, 400, 600, 700, 812, 900, 1000, 1100, 1200, 1300, 1400, 1500, 1600, 1700) according to claim 15, wherein the further voltage limiter comprises an over-voltage-protection (1106) and a voltage limiting controllable switch (1108), wherein a first input of the over-voltage-protection (1106) is coupled to the second input and a second input of the over-voltage-protection (1106) is coupled to a predefined reference voltage, an output of the over-voltage-protection (1106) is coupled to the voltage limiting controllable switch (1108) for controlling the voltage limiting controllable switch (1108) to be either in a conducting mode or in a non-conducting mode, and wherein the voltage limiting controllable switch (1108) is coupled to a node shared by the capacitive coupling (208, Ccap) and the further rectifying circuit (302, D2) and is coupled to a neutral voltage (N) of the power supply system (200, 300, 400, 600, 700, 812, 900, 1000, 1100, 1200, 1300, 1400, 1500, 1600, 1700).

17. A power supply system (200, 300, 400, 600, 700, 812, 900, 1000, 1100, 1200, 1300, 1400, 1500, 1600, 1700) according to claim 15, wherein:
the voltage limiter (214, Dzener2, D3a) comprises an over voltage protection (1504) for detecting the rectified output voltage being too high and too low with respect to the predefined voltage,
the further voltage limiter (304, Dzener1, D3b) comprises a voltage limiting controllable switch (1108) being coupled to a node shared by the capacitive coupling (208, Ccap) and the further rectifying circuit (302, D2) and is coupled to a neutral voltage (N) of the power supply system (200, 300, 400, 600, 700, 812, 900, 1000, 1100, 1200, 1300, 1400, 1500, 1600, 1700), the voltage limiting controllable switch (1108) being controlled by the over voltage protection (1504) to be in the conducting state if the absolute value of the rectified output voltage is too high, and to be in the non-conducting state if the absolute value of the rectified output voltage is too low.

* * * * *